US012628946B1

(12) United States Patent
Baloch

(10) Patent No.: US 12,628,946 B1
(45) Date of Patent: May 19, 2026

(54) FLAT-PACKABLE RETAIL DISPLAY SYSTEM WITH PRE-DRILLED APERTURES AND ALIGNMENT GUIDES

(71) Applicant: Irfan Ahmed Baloch, Tucker, GA (US)

(72) Inventor: Irfan Ahmed Baloch, Tucker, GA (US)

( * ) Notice: Subject to any disclaimer, the term of this patent is extended or adjusted under 35 U.S.C. 154(b) by 0 days.

(21) Appl. No.: 19/319,435

(22) Filed: Sep. 4, 2025

(51) Int. Cl.
| | |
|---|---|
| *A47B 47/00* | (2006.01) |
| *A47B 43/00* | (2006.01) |
| *A47B 47/02* | (2006.01) |
| *A47B 47/04* | (2006.01) |
| *A47B 87/00* | (2006.01) |
| *A47B 87/02* | (2006.01) |

(Continued)

(52) U.S. Cl.
CPC ......... *A47B 47/0075* (2013.01); *A47B 43/00* (2013.01); *A47B 47/00* (2013.01); *A47B 47/0091* (2013.01); *A47B 47/02* (2013.01); *A47B 47/025* (2013.01); *A47B 47/042* (2013.01); *A47B 87/02* (2013.01); *A47B 47/03* (2013.01); *A47B 87/0292* (2013.01); *A47F 3/004* (2013.01); *A47F 3/06* (2013.01); *F16B 5/0004* (2013.01); *F16B 5/02* (2013.01)

(58) Field of Classification Search
CPC ..... A47B 43/00; A47B 87/02; A47B 87/0292; A47B 47/0075; A47B 47/02; A47B 47/025; A47B 47/03; A47B 47/021; A47B 47/00; A47B 47/042; A47B 47/0091; A47B 47/005; A47B 47/0066; A47B 96/02; A47B 96/021; A47B 96/20; A47B 96/201; A47B 57/18; A47F 3/004; A47F 3/06
See application file for complete search history.

(56) References Cited

U.S. PATENT DOCUMENTS 1,431,173  A  *  10/1922  O'Connor .............. B21D 53/00
                                                   72/335
1,560,436  A  *  11/1925  Staples .................. A47B 96/02
                                                   211/153

(Continued)

FOREIGN PATENT DOCUMENTS

CN        108937168  A  *  12/2018  ........... A47B 47/025
DE          4330434  C2 *  5/1996  ............. A47B 31/00

(Continued)

*Primary Examiner* — Kimberley S Wright
(74) *Attorney, Agent, or Firm* — Adibi IP Group, PC; Amir V. Adibi; Andrew C. Palmer

(57) ABSTRACT

A retail display system includes a first base panel, a pair of side panels, a second base panel, and one or more shelf panels. Each base panel incorporates raised alignment guides and an alignment flange. The alignment guides engage body surfaces of adjoining panels, and the alignment flanges engage end surfaces of adjoining panels to ensure perpendicular orientation during assembly. Pre-drilled apertures extend through the panels and align to receive threaded fasteners, enabling fast and accurate installation. The shelf panels install between the side panels in user-selected positions to provide customizable vertical spacing for displayed goods. In some embodiments, a back panel attaches to the side panels and base panels to enclose the rear, and doors attach by hinges to enclose the front. In other embodiments, the system omits doors and provides an open configuration. All panels disassemble into a flat configuration and pack into a shipping container smaller than the assembled system.

19 Claims, 29 Drawing Sheets

ANOTHER PERSPECTIVE VIEW

(51) Int. Cl.

| | |
|---|---|
| *A47B 47/03* | (2006.01) |
| *A47F 3/00* | (2006.01) |
| *A47F 3/06* | (2006.01) |
| *F16B 5/00* | (2006.01) |
| *F16B 5/02* | (2006.01) |

(56) References Cited

U.S. PATENT DOCUMENTS

| | | | | |
|---|---|---|---|---|
| 2,651,557 | A | * | 9/1953 | Kelly, Jr. ............... A47B 47/03 312/257.1 |
| 4,288,132 | A | * | 9/1981 | Znamirowski ......... A47B 47/03 312/265.5 |
| 5,221,131 | A | * | 6/1993 | Lesperance .......... A47B 47/025 312/265.3 |
| 5,704,699 | A | * | 1/1998 | Pagelow ............ A47B 87/0292 312/265.3 |
| 2005/0248242 | A1 | * | 11/2005 | Yang .................. A47B 47/0075 312/257.1 |
| 2010/0173122 | A1 | * | 7/2010 | Susnjara .............. F16B 12/125 144/347 |
| 2016/0100684 | A1 | * | 4/2016 | Koehn ................... A47B 57/16 312/258 |
| 2017/0318960 | A1 | * | 11/2017 | Boone .................... A47B 96/20 |

FOREIGN PATENT DOCUMENTS

| | | | | | |
|---|---|---|---|---|---|
| GB | 580654 | A | * | 9/1946 | ............. A47B 47/03 |
| JP | 2020074817 | A | * | 5/2020 | |

* cited by examiner

RETAIL DISPLAY
SYSTEM
10

HINGE
20

BASE PANEL
11

HANDLE
17

HINGE
20

SIDE PANEL
13

DOOR
16

WHEEL
21

DOOR
16

WHEEL
21

WHEEL
21

WHEEL
21

PERSPECTIVE VIEW

RETAIL DISPLAY
SYSTEM
10

BASE PANEL
11

SHELF PANEL
15

SIDE
PANEL
13

SHELF PANEL
15

HANDLE
17

SHELF PANEL
15

HINGE
20

BASE PANEL
11

WHEEL
21

SIDE PANEL
13

DOOR
16

WHEEL
21

WHEEL
21

ANOTHER PERSPECTIVE VIEW

PERSPECTIVE EXPLODED VIEW

PERSPECTIVE VIEW OF STACKED NOVEL RETAIL DISPLAYS

RAISED
ALIGNMENT
GUIDE
25

22
PRE-DRILLED
APERTURE

BASE PANEL
11

ALIGNMENT
FLANGE
26

PRE-DRILLED
APERTURE
22

BASE PANEL

BASE PANEL
11

25
RAISED
ALIGNMENT
GUIDE

BASE PANEL

BASE PANEL

BASE PANEL

WHEEL
21

BASE PANEL
11

WHEEL
21

BASE PANEL WITH WHEELS

END
SURFACE
31

SIDE
PANEL
13

PRE-DRILLED
APERTURE
22

BODY
SURFACE
32

END
SURFACE
31

SIDE
PANEL
13

BODY
SURFACE
32

SIDE PANEL

SIDE PANEL

END
SURFACE
31

PRE-DRILLED
APERTURE
22

BODY
SURFACE
32

BACK
PANEL
14

BACK PANEL

BACK PANEL
14

END
SURFACE
31

BODY
SURFACE
32

BACK PANEL

RAISED
ALIGNMENT
GUIDE
25

23
PRE-DRILLED
SHELF
APERTURE

SHELF PANEL
15

PRE-DRILLED
SHELF
APERTURE
23

SHELF PANEL

FRONT VIEW OF DOORS

TOP VIEW OF DOORS

PERSPECTIVE VIEW OF DOORS

HANDLE
17

HANDLE
COMPONENT

HANDLE
17

HANDLE
COMPONENT

HANDLE
17

HANDLE
COMPONENT

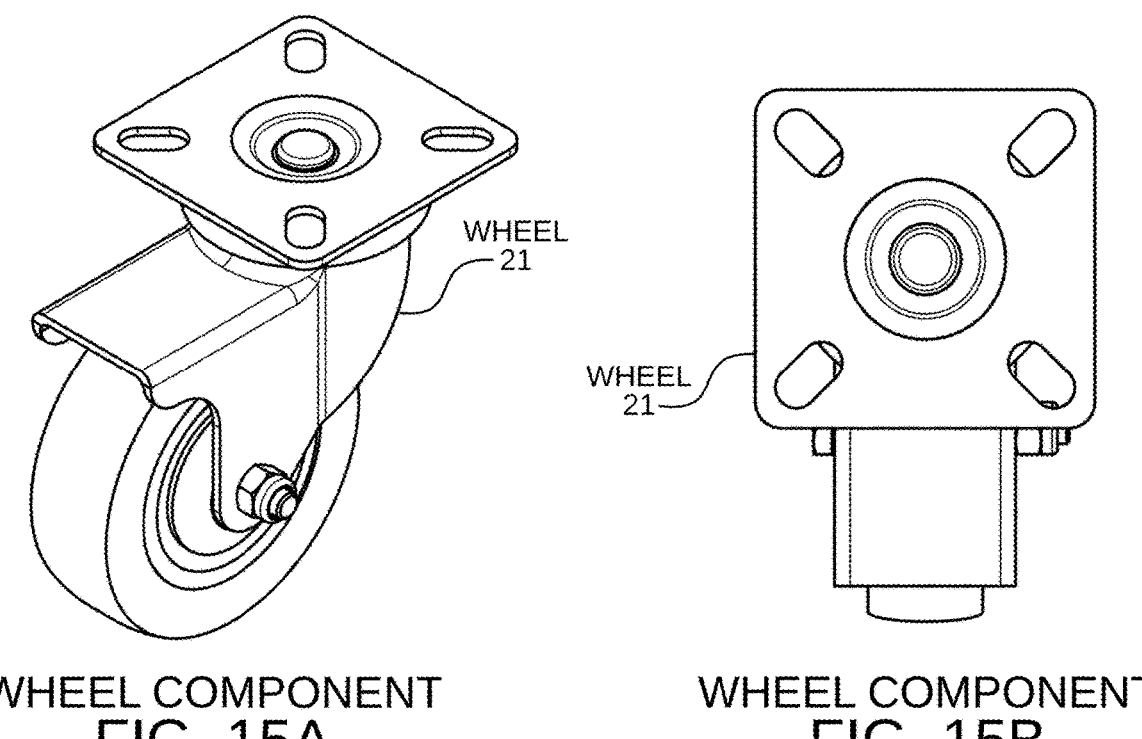
WHEEL COMPONENT
FIG. 15A
WHEEL COMPONENT
FIG. 15B
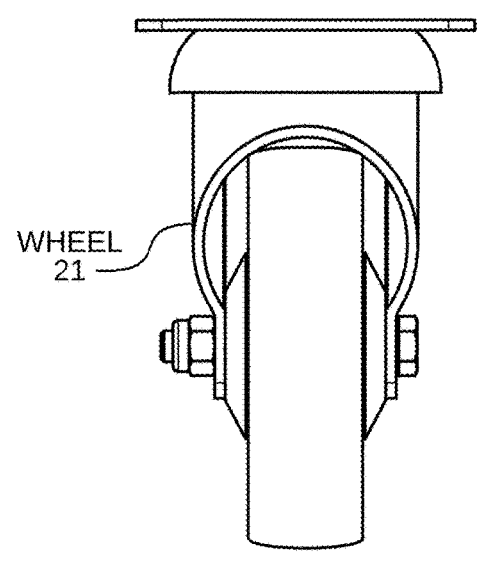
WHEEL COMPONENT
FIG. 15C

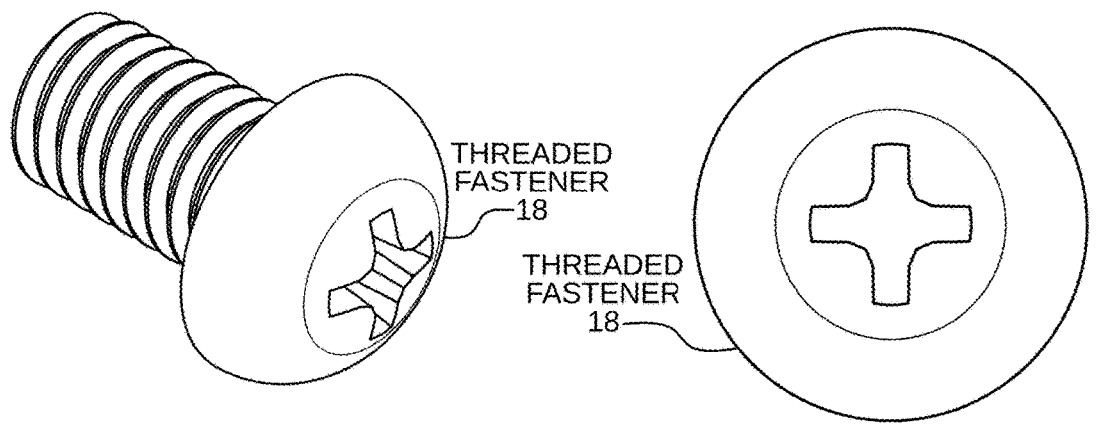
THREADED FASTENER
FIG. 16A
THREADED FASTENER
FIG. 16B
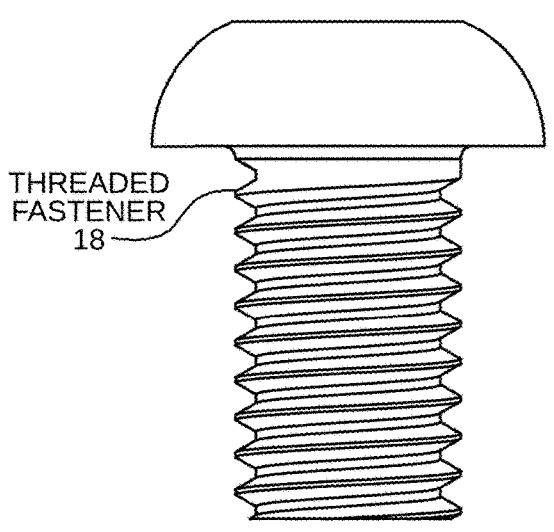
THREADED FASTENER
FIG. 16C

FLAT-PACK CONFIGURATION OF RETAIL DISPLAY

ATTACH SIDE
PANELS TO
FIRST BASE
PANEL

ATTACH
SECOND BASE
PANEL

ATTACH BACK
PANEL

ASSEMBLY
STEPS

ASSEMBLY
STEPS

ASSEMBLY
STEPS

STACKED RETAIL
DISPLAY SYSTEM
50

ASSEMBLING
STACKED RETAIL
DISPLAY SYSTEM

STACKED RETAIL
DISPLAY SYSTEM
50

STACKED RETAIL
DISPLAY SYSTEM

OPEN RETAIL DISPLAY
SYSTEM
100

OPEN RETAIL DISPLAY SYSTEM
(ANOTHER EMBODIMENT)

BASE PANEL
111

SIDE
PANEL
113

BACK
PANEL
114

ANOTHER PERSPECTIVE VIEW OF OPEN RETAIL
DISPLAY EMBODIMENT

RAISED
ALIGNMENT
GUIDE
125

122
PRE-DRILLED
APERTURE

BASE PANEL
111

PRE-DRILLED
APERTURE
122

126
ALIGNMENT
FLANGE

BASE PANEL OF OPEN RETAIL DISPLAY EMBODIMENT

BASE PANEL
111

125
RAISED
ALIGNMENT
GUIDE

BASE PANEL OF OPEN RETAIL DISPLAY EMBODIMENT

PRE-DRILLED
APERTURE
122

SIDE
PANEL
113

SIDE PANEL

SIDE
PANEL
113

SIDE PANEL

PRE-DRILLED
APERTURE
122

BACK
PANEL
114

BACK PANEL

BACK PANEL
114

BACK PANEL

SHELF PANEL OF OPEN RETAIL DISPLAY EMBODIMENT

THREADED
FASTENER
—118

THREADED
FASTENER

THREADED
FASTENER
118—

THREADED
FASTENER

THREADED
FASTENER
118—

THREADED
FASTENER

FLAT-PACK CONFIGURATION OF OPEN RETAIL DISPLAY

ATTACH SIDE PANELS TO
FIRST BASE PANEL

ATTACH SECOND BASE
PANEL TO SIDE PANELS

ATTACH BACK PANEL TO
BASE PANELS

OPEN RETAIL
DISPLAY SYSTEM
100

ATTACH SHELF PANELS

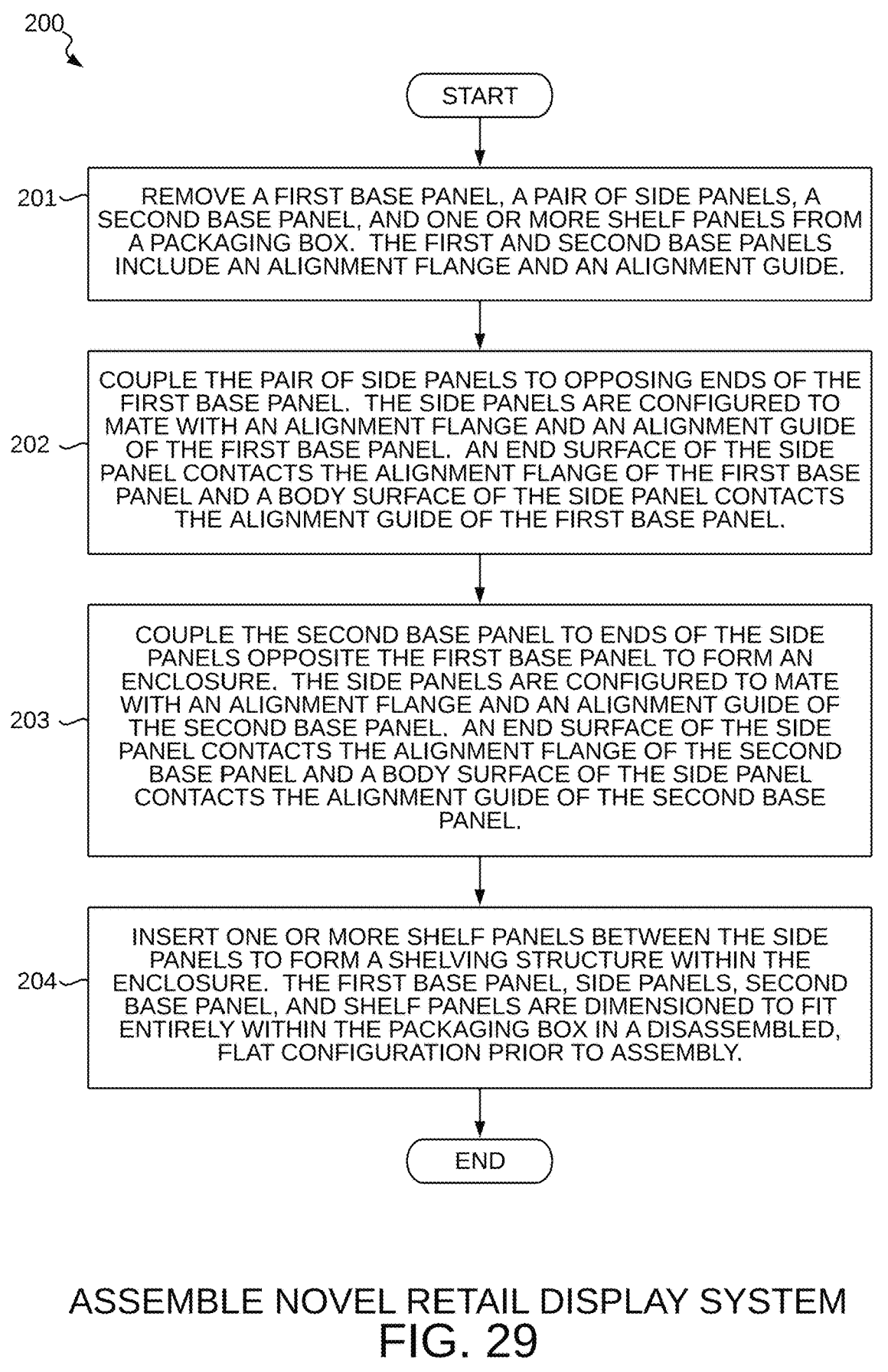

200

START

201 — REMOVE A FIRST BASE PANEL, A PAIR OF SIDE PANELS, A SECOND BASE PANEL, AND ONE OR MORE SHELF PANELS FROM A PACKAGING BOX. THE FIRST AND SECOND BASE PANELS INCLUDE AN ALIGNMENT FLANGE AND AN ALIGNMENT GUIDE.

202 — COUPLE THE PAIR OF SIDE PANELS TO OPPOSING ENDS OF THE FIRST BASE PANEL. THE SIDE PANELS ARE CONFIGURED TO MATE WITH AN ALIGNMENT FLANGE AND AN ALIGNMENT GUIDE OF THE FIRST BASE PANEL. AN END SURFACE OF THE SIDE PANEL CONTACTS THE ALIGNMENT FLANGE OF THE FIRST BASE PANEL AND A BODY SURFACE OF THE SIDE PANEL CONTACTS THE ALIGNMENT GUIDE OF THE FIRST BASE PANEL.

203 — COUPLE THE SECOND BASE PANEL TO ENDS OF THE SIDE PANELS OPPOSITE THE FIRST BASE PANEL TO FORM AN ENCLOSURE. THE SIDE PANELS ARE CONFIGURED TO MATE WITH AN ALIGNMENT FLANGE AND AN ALIGNMENT GUIDE OF THE SECOND BASE PANEL. AN END SURFACE OF THE SIDE PANEL CONTACTS THE ALIGNMENT FLANGE OF THE SECOND BASE PANEL AND A BODY SURFACE OF THE SIDE PANEL CONTACTS THE ALIGNMENT GUIDE OF THE SECOND BASE PANEL.

204 — INSERT ONE OR MORE SHELF PANELS BETWEEN THE SIDE PANELS TO FORM A SHELVING STRUCTURE WITHIN THE ENCLOSURE. THE FIRST BASE PANEL, SIDE PANELS, SECOND BASE PANEL, AND SHELF PANELS ARE DIMENSIONED TO FIT ENTIRELY WITHIN THE PACKAGING BOX IN A DISASSEMBLED, FLAT CONFIGURATION PRIOR TO ASSEMBLY.

END

ASSEMBLE NOVEL RETAIL DISPLAY SYSTEM

FIG. 29

FLAT-PACKABLE RETAIL DISPLAY SYSTEM WITH PRE-DRILLED APERTURES AND ALIGNMENT GUIDES

TECHNICAL FIELD

The present disclosure relates generally to retail display systems and, more particularly, to modular display systems that assemble from panels into a structure suitable for storing and presenting goods.

BACKGROUND INFORMATION

A retail display system is commonly used in stores, showrooms, and other environments to present goods to customers. Retail display systems often include panels, shelves, or enclosures that support products and make them accessible for viewing and purchase. Various types of retail display systems exist, and they can be constructed from different materials and configured in different arrangements depending on the intended use.

SUMMARY

A retail display system provides a compact, modular structure that ships in a flat-packed configuration and assembles with minimal tools. The system includes base panels with integrated alignment guides and alignment flanges that simplify installation and ensure accurate panel positioning. A combination of pre-drilled apertures and removable threaded fasteners enables repeated assembly and disassembly without loss of structural integrity.

In one aspect, the retail display system achieves efficient packaging. In a "flat-packed" configuration, the base panels, side panels, back panel, and shelf panels all dimension to fit entirely within a shipping container in a disassembled, flat configuration. This flat-pack approach reduces storage volume, lowers shipping costs, and facilitates transport to retail locations. In certain embodiments, the packaging container is no larger than 1.1 times the length, width, and height of the stacked panels.

In another aspect, the retail display system enables fast and accurate installation. Each base panel incorporates raised alignment guides and an alignment flange. The alignment guides engage the body surfaces of adjoining panels, while the alignment flanges engage the end surfaces of adjoining panels. These features ensure square joints without requiring specialized skills or precision measurements during setup. Pre-drilled apertures further reduce assembly time by providing tool-ready connections for threaded fasteners.

In a further aspect, the retail display system supports flexible configurations. Shelf panels install in selectable vertical positions to create customizable shelf spacing. In some embodiments, front-facing doors attach by hinges to provide a closed configuration. In other embodiments, the system omits doors entirely to provide an open retail display system. Wheels or casters may also attach to the underside of a base panel to permit mobility within a retail environment.

In one embodiment, a closed retail display system includes a pair of doors coupled to side panels with hinges and secured by a handle and lock. In another embodiment, an open retail display system omits doors and exposes multiple shelf panels accessible from the front face. In yet another embodiment, two or more retail display systems stack vertically using alignment features integrated into the base panels, forming a stacked retail display system. Each embodiment maintains compatibility with the flat-pack packaging format, alignment guide and flange assembly features, and pre-drilled aperture fastening system.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIGS. 15A-15C are diagrams of a wheel 21.

FIGS. 16A-16C are diagrams of a threaded fastener 18.

FIG. 29 is a flowchart of a method 200 of assembling a retail display system.

DETAILED DESCRIPTION

Reference will now be made in detail to some embodiments of the invention, examples of which are illustrated in the accompanying drawings.

Figure 1:
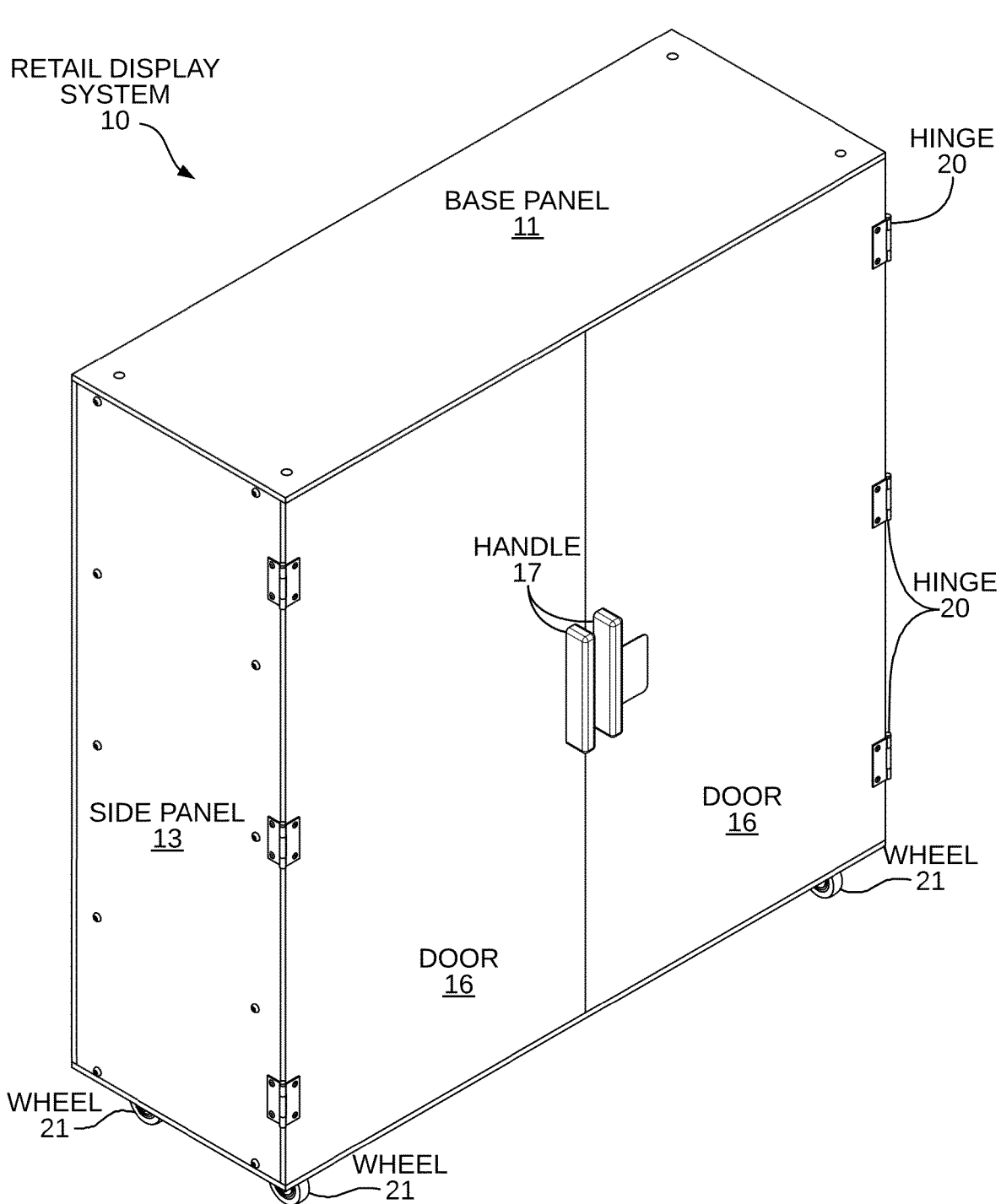
FIG. 1 is a perspective diagram of a retail display system 10 in a closed configuration.

FIG. 1 is a perspective diagram of a retail display system 10 in an assembled configuration. A base panel 11 supports a pair of side panels 13 along opposing edges. Each side panel 13 extends vertically from the base panel 11 to define the lateral sides of the retail display system 10.

A pair of doors 16 attach to the side panels 13 by way of hinges 20. The hinges 20 mount along the vertical edges of the side panels 13 and the corresponding edges of the doors 16, enabling the doors 16 to rotate between open and closed positions. A handle 17 attaches to the front of the doors 16 to allow a user to pull or push the doors for access to the interior of the retail display system 10.

A plurality of wheels 21 attach to the underside of the base panel 11. The wheels 21 support the retail display system 10 above a floor surface and allow the user to reposition or transport the system in its assembled state.

The retail display system 10 in FIG. 1 presents a closed configuration, with the doors 16 covering the front face. The side panels 13, base panel 11, and doors 16 define the external structure, while additional panels and interior shelving, shown in later figures, provide internal support and display functionality.

Figure 2:
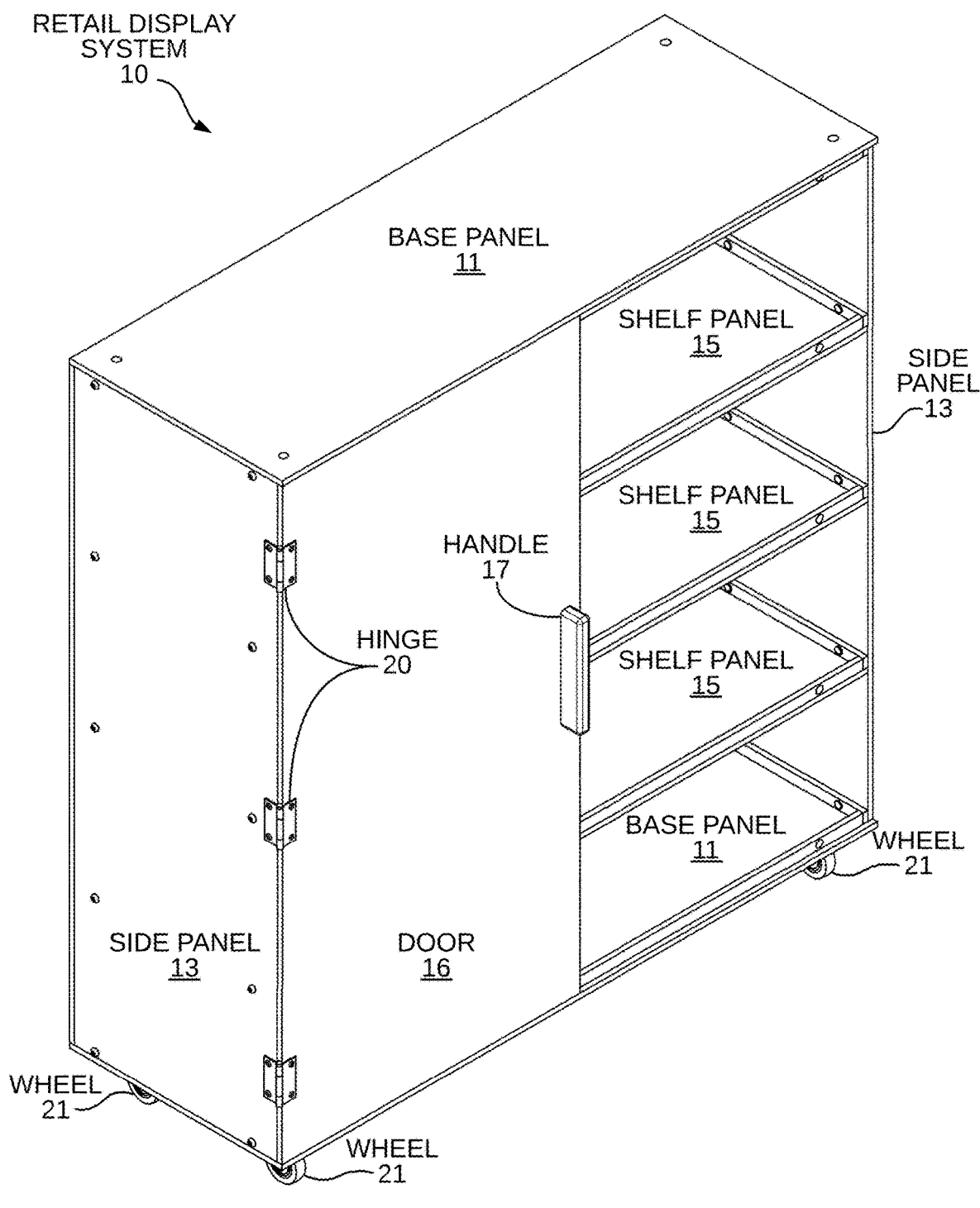
FIG. 2 is another perspective diagram of the retail display system 10 with doors partially open to reveal internal shelves.

FIG. 2 is a perspective diagram of the retail display system 10 with one of the doors 16 in an open configuration. The open door exposes a series of shelf panels 15 mounted between the pair of side panels 13. Each shelf panel 15 spans laterally across the retail display system 10 and provides a horizontal support surface for displaying retail goods.

The base panel 11 supports the side panels 13 at opposing edges and establishes a stable lower boundary of the retail display system 10. A plurality of wheels 21 attach to the underside of the base panel 11 to permit the user to move or reposition the retail display system 10.

A handle 17 attaches to the exterior face of the door 16 to enable the user to open and close the door. A set of hinges 20 mount between the side panel 13 and the door 16 to allow the door to rotate relative to the side panel 13.

The retail display system 10 in FIG. 2 illustrates an interior configuration that supports multiple shelf panels 15. The user can vary the number and spacing of the shelf panels 15 to adapt the retail display system 10 for products of different sizes.

Figure 3:
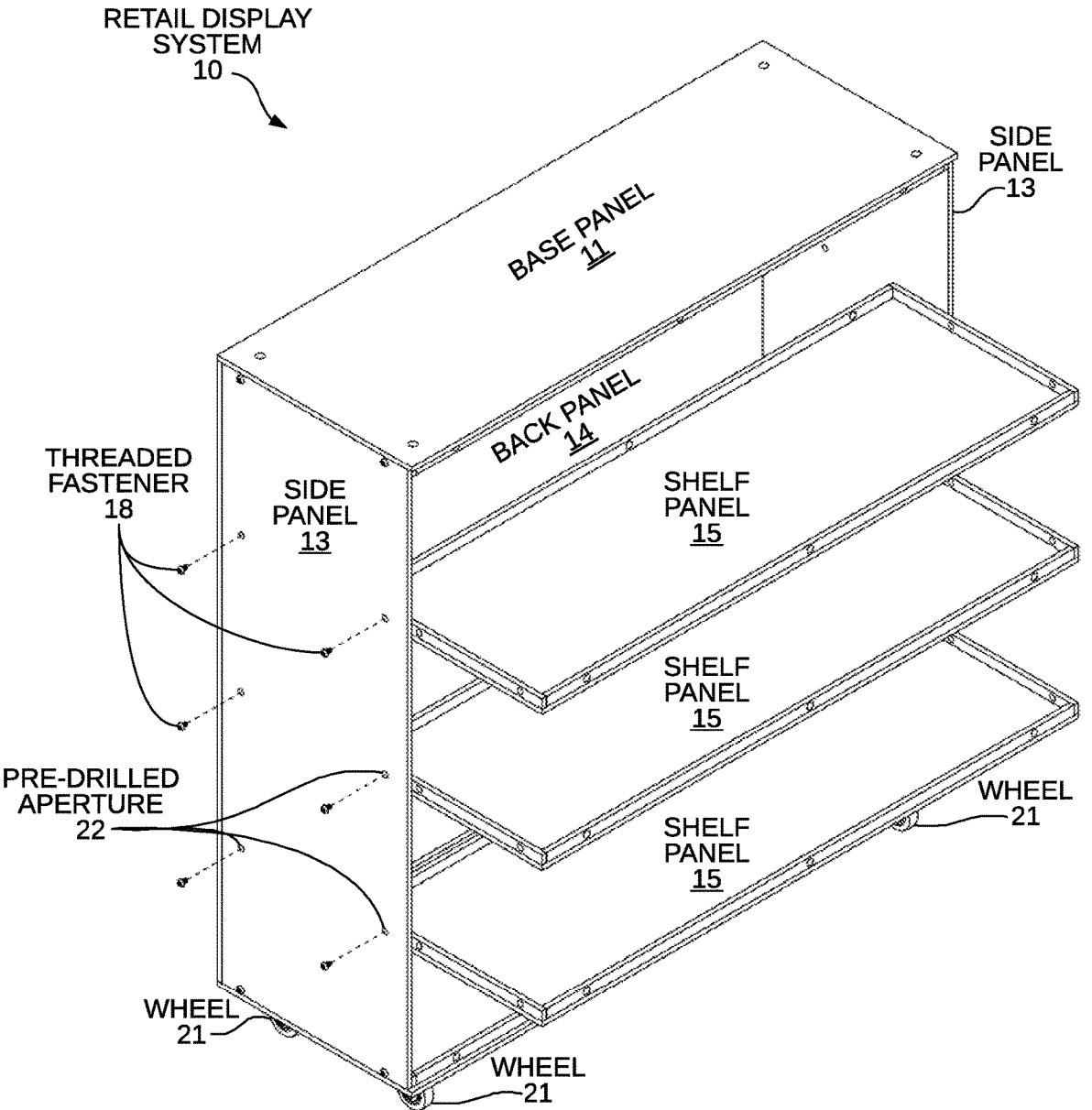
FIG. 3 is a perspective exploded diagram of the retail display system 10 showing attachment of the panels and shelves.

FIG. 3 is a perspective diagram of the retail display system 10 in an exploded configuration. A base panel 11 supports a pair of side panels 13 along opposing lateral edges. Each side panel 13 includes a series of pre-drilled apertures 22 that align with corresponding apertures in the base panel 11. Threaded fasteners 18 insert through the pre-drilled apertures 22 to secure the side panels 13 to the base panel 11.

A back panel 14 extends vertically between the side panels 13 and attaches to the rear edges of the side panels 13 and the base panel 11. The back panel 14 reinforces the structure and closes the rear face of the retail display system 10.

A plurality of shelf panels 15 mount between the side panels 13 in a stacked arrangement. Each shelf panel 15 spans laterally across the retail display system 10 to provide a horizontal surface for supporting retail goods. The shelf panels 15 position along the side panels 13 by way of the pre-drilled apertures 22 and corresponding fasteners 18.

A plurality of wheels 21 attach to the underside of the base panel 11. The wheels 21 support the retail display system 10 above a floor surface and enable the user to reposition the system without disassembly. The exploded configuration of FIG. 3 illustrates the relationship of the base panel 11, side panels 13, back panel 14, shelf panels 15, and wheels 21 during assembly of the retail display system 10.

Figure 4:
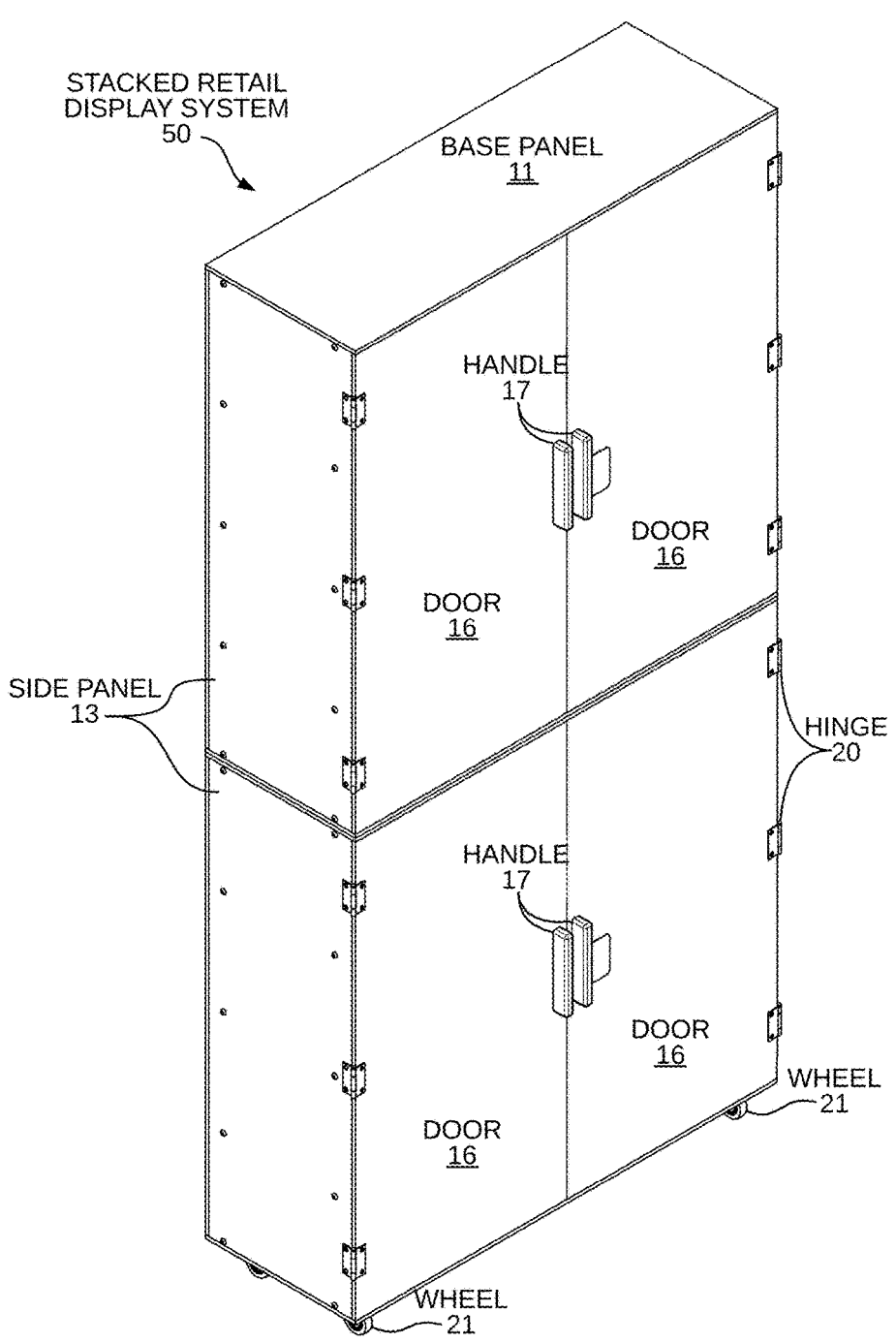
FIG. 4 is a perspective diagram of a stacked retail display system 50 formed by coupling two retail display systems 10.

FIG. 4 is a perspective diagram of a stacked retail display system 50 in an assembled configuration. The stacked retail display system 50 includes two retail display systems, such as retail display system 10 arranged vertically on top of one another. A base panel 11 of an upper retail display system 10 rests directly above a base panel 11 of a lower retail display system 10.

Each retail display system 10 in the stacked configuration includes a pair of doors 16 mounted to side panels 13 by way of hinges 20. A handle 17 attaches to the front of each set of doors 16 to permit user operation. The stacked configuration therefore presents four doors 16 across the front face, with each pair of doors 16 providing access to a corresponding retail display system 10.

A plurality of wheels 21 attach to the underside of the lower base panel 11 to support the stacked retail display system 50 above a floor surface and enable repositioning of the entire stacked structure.

The stacked retail display system 50 illustrates how multiple units of the retail display system 10 align and secure together to provide a taller display arrangement. The configuration permits modular scalability, allowing a user to combine multiple retail display systems 10 while maintaining stability and access to each individual unit.

Figure 5A:
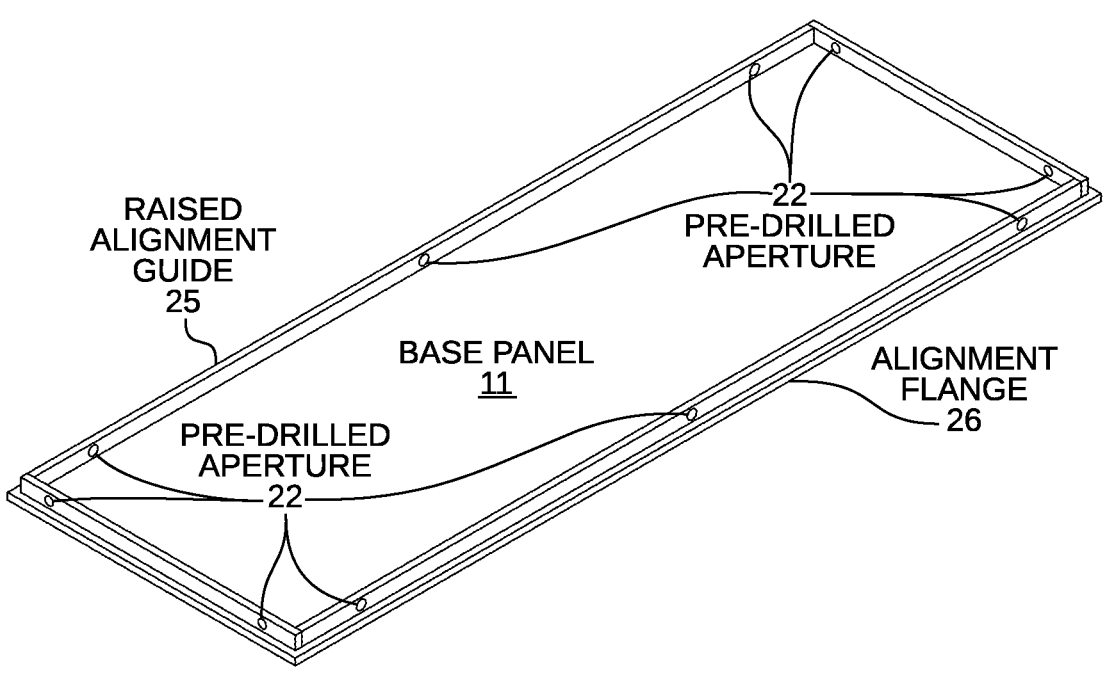
FIG. 5A is a perspective diagram of a base panel 11 of the retail display system 10.

FIG. 5A is a perspective diagram of a base panel 11 of the retail display system 10. The base panel 11 includes a plurality of pre-drilled apertures 22 positioned along its perimeter. A series of raised alignment guides 25 extend upward from the base panel 11. Each raised alignment guide 25 cooperates with an alignment flange 26 formed at the edge of the base panel 11. The raised alignment guides 25 and alignment flanges 26 collectively receive and position adjoining panels such as the side panels 13 and back panel 14 during assembly. The pre-drilled apertures 22 align with corresponding apertures in the adjoining panels to accept fasteners and secure the base panel 11 in place.

Figure 5B:
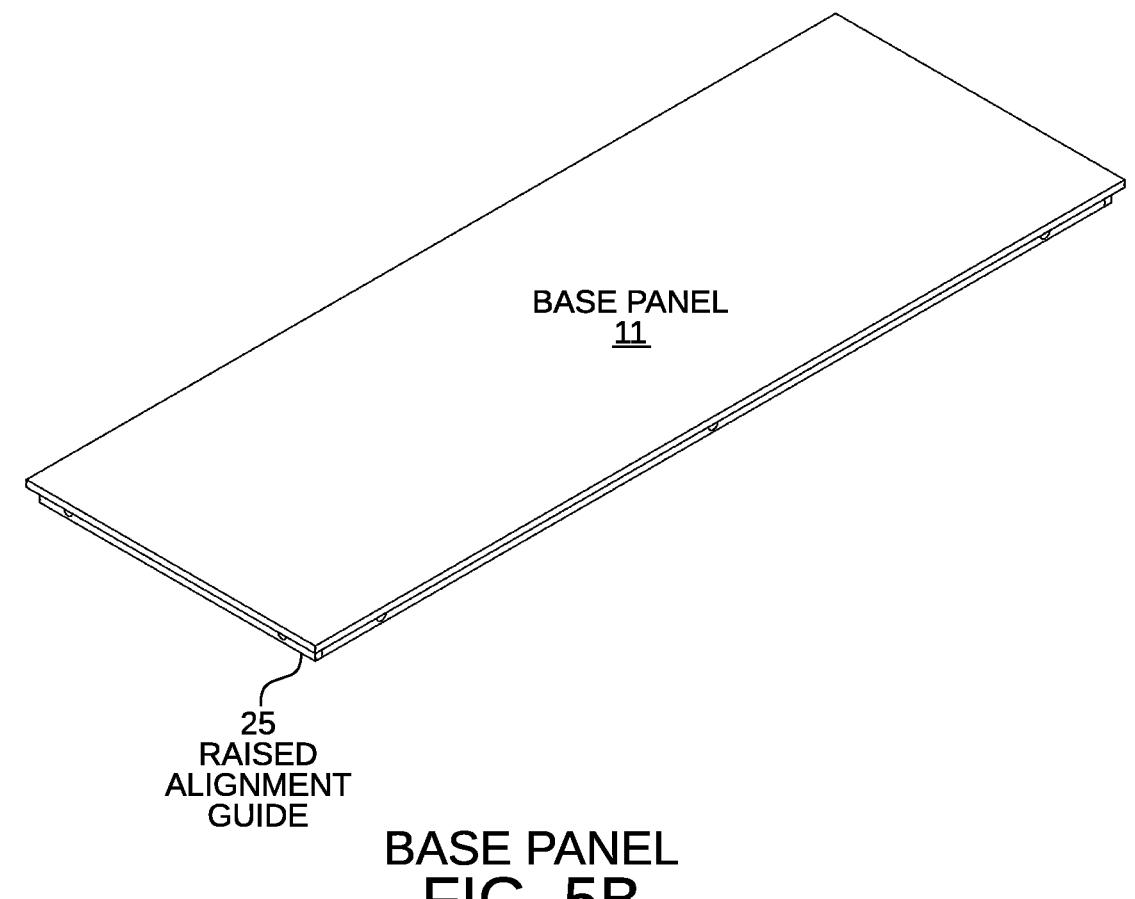
FIG. 5B is another perspective diagram of the base panel 11.

FIG. 5B is another perspective diagram of the base panel 11. The view of FIG. 5B further illustrates the raised alignment guides 25 projecting upward from the panel surface. These raised alignment guides 25 provide vertical registration features that ensure accurate placement of the adjoining panels. Together with the alignment flanges 26 shown in FIG. 5A, the raised alignment guides 25 form a guiding and mating interface that simplifies assembly of the retail display system 10 and improves structural stability of the assembled configuration.

In certain embodiments, the base panel 11 includes raised alignment guides 25 and alignment flanges 26 along all four sides. In other embodiments, the alignment features extend along only a subset of the sides, such as the lateral edges or the rear edge, while still permitting the retail display system 10 to assemble into a stable configuration. The raised alignment guides 25 extend upward by a height proportionate to the thickness of the adjoining panel, and in some embodiments by less than one-quarter of the thickness of the adjoining panel. The alignment flange 26 projects laterally inward by a distance greater than the thickness of the raised alignment guide 25, thereby forming a stepped interface. In further embodiments, the base panel 11 includes only the raised alignment guides 25 and alignment flanges 26 shown, without additional ribs, grooves, or protruding members.

Figure 6A:
FIG. 6A is a top view diagram of the base panel 11.

FIG. 6A is a top view diagram of a base panel 11. The base panel 11 includes a continuous alignment flange 26 extending along its perimeter. A series of raised alignment guides 25 project upward from the surface of the base panel 11 and define vertical registration structures for adjoining panels. The alignment flange 26 and raised alignment guides 25 operate together to position and secure side panels 13 and back panels 14 relative to the base panel 11 during assembly.

Figure 6B:
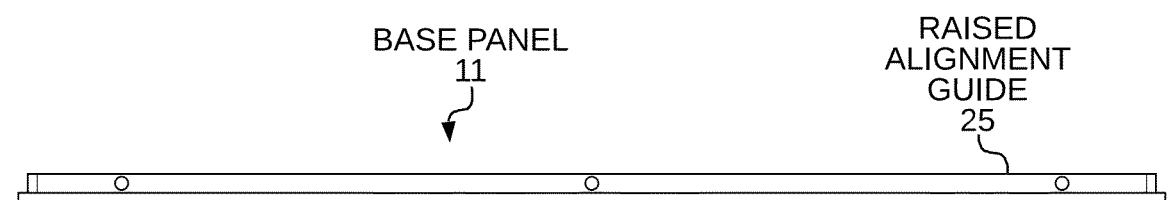
FIG. 6B is a side view diagram of the base panel 11.

FIG. 6B is a side view diagram of the base panel 11. The side view illustrates the raised alignment guides 25 extending vertically from the upper surface of the base panel 11. The raised alignment guides 25 create contact surfaces that mate with adjoining panels and maintain perpendicular alignment between the panels and the base panel 11. The raised alignment guides 25, in cooperation with the alignment flange 26 shown in FIG. 6A, provide a guiding and mating interface that simplifies assembly and increases stability of the assembled retail display system 10.

In certain embodiments, the base panel 11 defines a planar surface without recessed channels or slots, such that the only alignment features are the raised alignment guides 25 and alignment flanges 26. In other embodiments, the raised alignment guides 25 extend continuously along an entire edge, while in alternative embodiments they are discontinuous and located only at selected regions. In further embodiments, the alignment flange 26 extends around the entire perimeter of the base panel 11, while in other embodiments it extends around less than the full perimeter. These variations allow the retail display system 10 to accommodate different assembly tolerances, panel thicknesses, and manufacturing processes.

Figure 7:
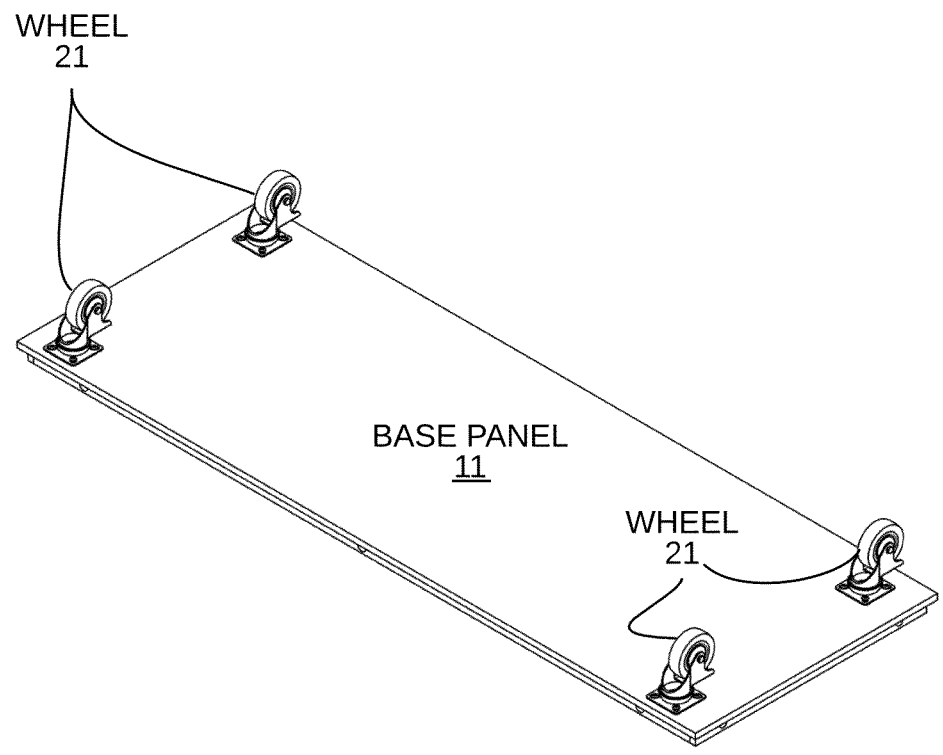
FIG. 7 is a perspective diagram of the base panel 11 with wheels 21.

FIG. 7 is a perspective diagram of a base panel 11 with a plurality of wheels 21 attached to its underside. Each wheel 21 mounts near a corner of the base panel 11 to support the retail display system 10 above a floor surface. The wheels 21 permit the user to roll or reposition the retail display system 10 in an assembled configuration.

In certain embodiments, the wheels 21 comprise swiveling casters that allow multidirectional movement. In other embodiments, the wheels 21 are fixed rollers that restrict movement to a single axis. In further embodiments, the base panel 11 includes four wheels 21 located at each corner as shown, while in other embodiments additional wheels 21 mount along the edges to distribute loads. In some configurations, the base panel 11 omits wheels 21 altogether and instead rests directly on the floor surface.

The arrangement of FIG. 7 illustrates that the wheels 21 attach directly to the underside of the base panel 11 without the need for a separate frame or chassis. The use of wheels 21 provides mobility to the retail display system 10 while maintaining the flat-pack nature of the assembly.

Figures 8A, 8B:
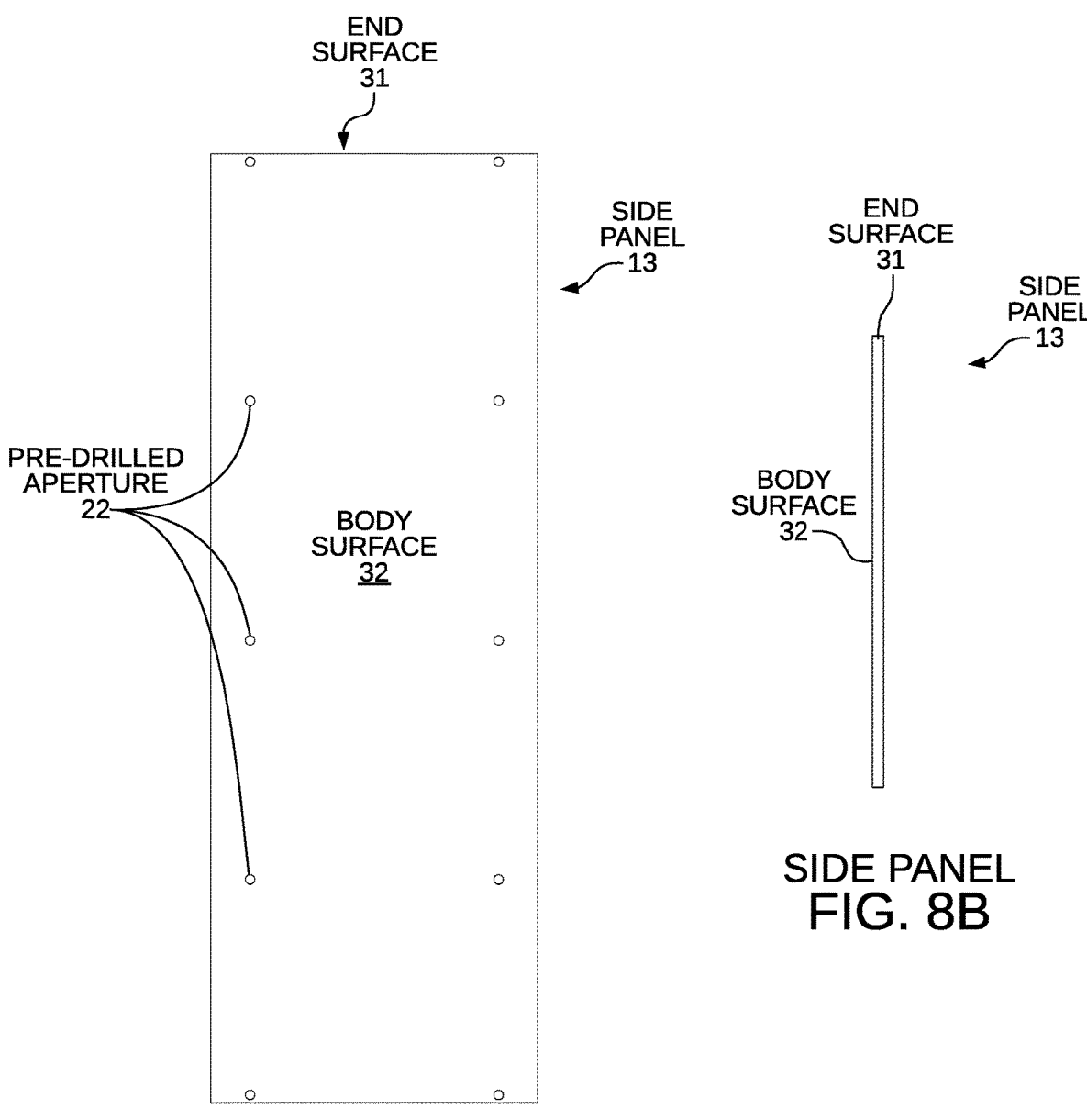
FIG. 8A is a front view diagram of a side panel 13 of the retail display system 10.
FIG. 8B is a side view diagram of the side panel 13.

FIG. 8A is a front view diagram of a side panel 13 of the retail display system 10. The side panel 13 includes an end surface 31 at its upper edge and a body surface 32 extending downward from the end surface 31. A plurality of pre-drilled apertures 22 are distributed along the body surface 32. The pre-drilled apertures 22 align with corresponding apertures in the base panel 11, back panel 14, and shelf panels 15 to receive fasteners during assembly.

FIG. 8B is a side view diagram of the side panel 13. The end surface 31 defines the thickness of the side panel 13. The body surface 32 extends vertically from the end surface 31 and provides a planar contact face that abuts the raised alignment guides 25 of the base panel 11. The end surface 31 abuts the alignment flange 26 of the base panel 11, as shown in earlier figures.

In certain embodiments, the side panel 13 includes pre-drilled apertures 22 along its entire height, allowing the user to vary the vertical placement of shelf panels 15. In other embodiments, the pre-drilled apertures 22 occupy only selected regions of the body surface 32. In further embodiments, the side panel 13 consists of a single flat body surface 32 and the end surface 31, without recesses, grooves, or additional protruding members. The absence of other structural features ensures that the raised alignment guides 25 and alignment flanges 26 of the base panel 11 provide the primary alignment functions during assembly.

Figure 9A:
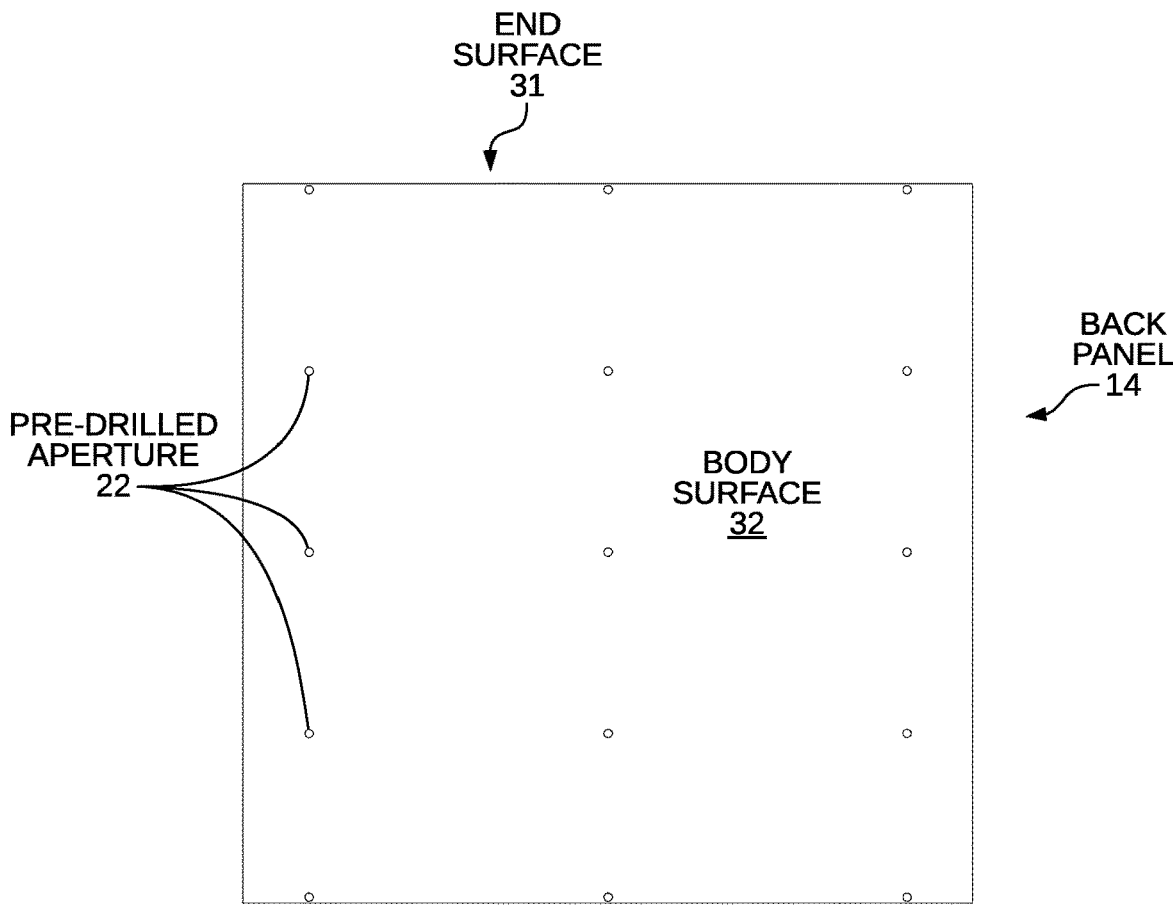
FIG. 9A is a front view diagram of a back panel 14 of the retail display system 10.

FIG. 9A is a front view diagram of a back panel 14 of the retail display system 10. The back panel 14 includes an end surface 31 along its perimeter and a body surface 32 extending inward from the end surface 31. A plurality of pre-drilled apertures 22 are formed through the body surface 32. The pre-drilled apertures 22 align with corresponding apertures in the base panel 11 and side panels 13 to receive threaded fasteners 18 during assembly. The back panel 14 spans the full width of the retail display system 10 and provides structural reinforcement along the rear side.

Figure 9B:
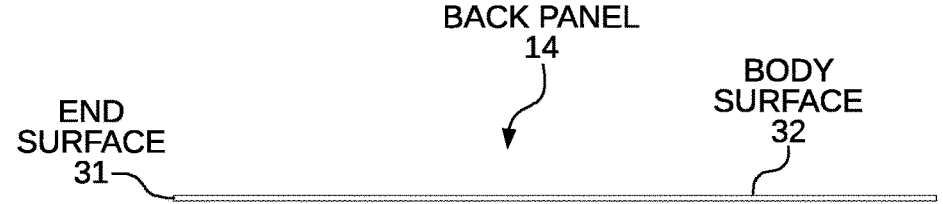
FIG. 9B is a side view diagram of the back panel 14.

FIG. 9B is a side view diagram of the back panel 14. The side view illustrates the relative thickness defined by the end surface 31 and the planar extent of the body surface 32. The end surface 31 contacts the alignment flange 26 of the base panel 11, while the body surface 32 rests against the raised alignment guide 25 of the base panel 11 to ensure proper alignment.

In certain embodiments, the back panel 14 includes pre-drilled apertures 22 arranged along its entire vertical height to permit shelf panels 15 to be secured at multiple levels. In other embodiments, the apertures 22 are limited to selected regions. In further embodiments, the back panel 14 consists of the flat body surface 32 and the end surface 31 without grooves, recessed channels, or protrusions, such that the primary alignment features are provided by the base panel 11. In alternative embodiments, the back panel 14 attaches directly to the side panels 13 without the use of fasteners, relying solely on press-fit engagement with the alignment flange 26 and raised alignment guides 25.

Figure 10:
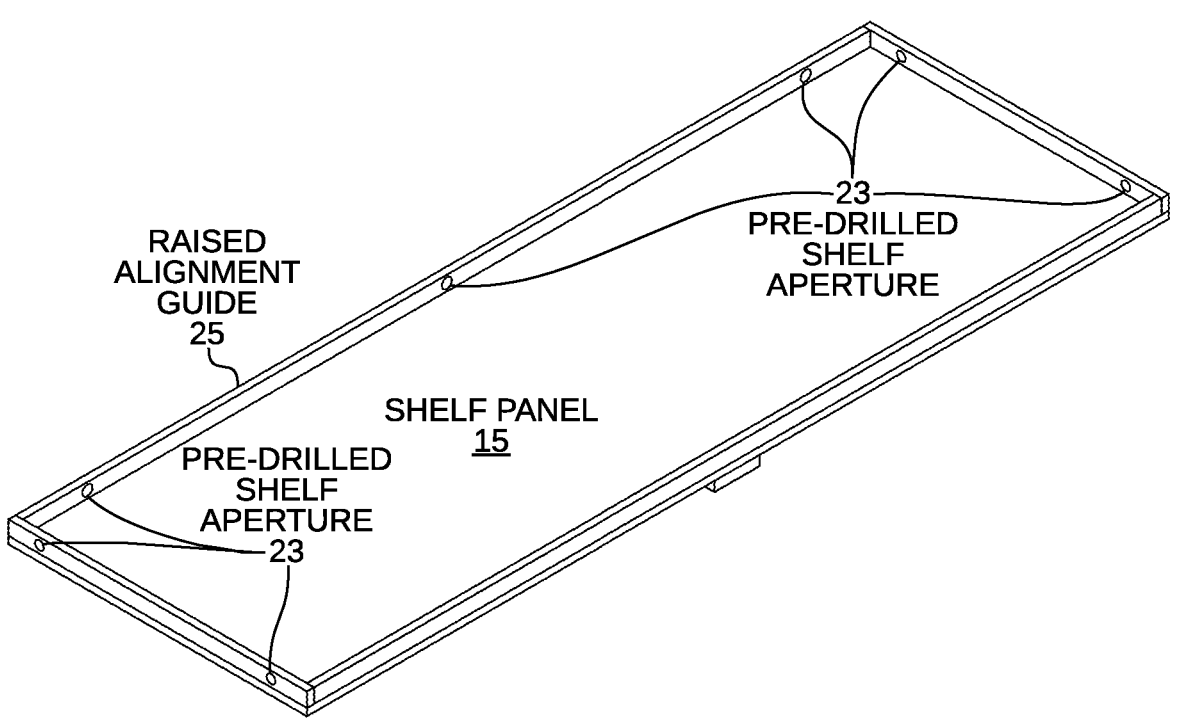
FIG. 10 is a perspective diagram of a shelf panel 15 of the retail display system 10.

FIG. 10 is a perspective diagram of a shelf panel 15 of the retail display system 10. The shelf panel 15 defines a generally planar support surface configured to receive and display retail goods. A series of raised alignment guides 25 extend upward along the lateral and rear edges of the shelf panel 15. The raised alignment guides 25 engage with the interior surfaces of the side panels 13 and back panel 14 to position the shelf panel 15 within the retail display system 10.

A plurality of pre-drilled shelf apertures 23 extend through the raised alignment guides 25. The pre-drilled shelf apertures 23 align with corresponding apertures in the side panels 13 to receive fasteners. This arrangement secures the shelf panel 15 between the side panels 13 and allows the shelf panel 15 to resist downward loading.

In certain embodiments, the shelf panel 15 includes raised alignment guides 25 along all of its edges. In other embodiments, the raised alignment guides 25 extend along only a subset of the edges, such as the lateral edges, while the rear edge includes only an alignment flange. In further embodiments, the shelf panel 15 includes only the raised alignment guides 25 and pre-drilled shelf apertures 23 shown, without additional ribs, hooks, or protrusions. The raised alignment guides 25 extend upward by a height sufficient to register against the body surfaces 32 of the side panels 13, and in some embodiments by less than one-quarter of the total thickness of the side panel 13.

This configuration enables the shelf panel 15 to install and remove selectively, allowing the user to customize the vertical spacing between shelves and adapt the retail display system 10 for different product sizes.

Figure 11:
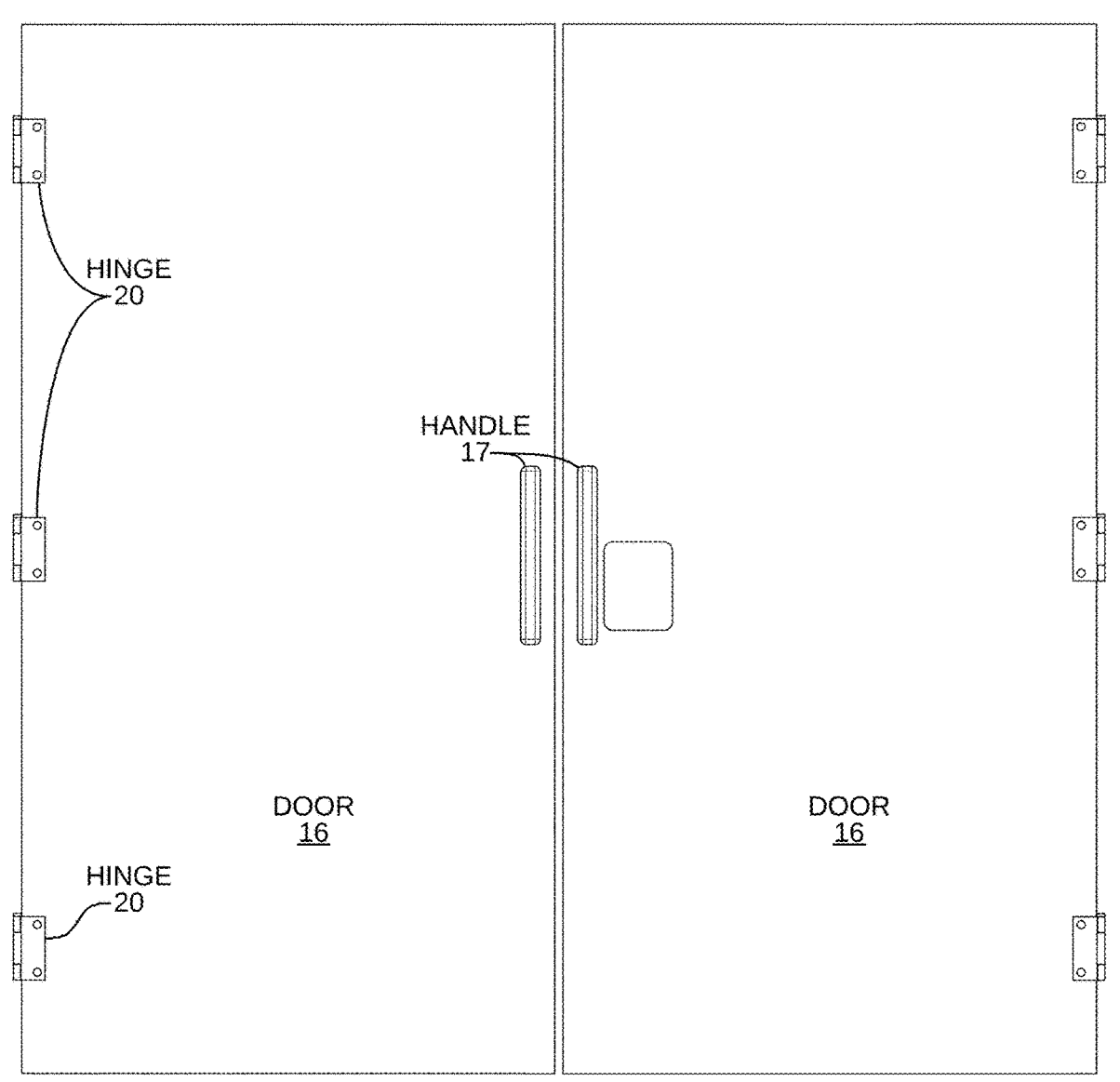
FIG. 11 is a front view diagram of a pair of doors 16 of the retail display system 10.

FIG. 11 is a front view diagram of a pair of doors 16 of the retail display system 10. Each door 16 attaches to a corresponding side panel 13 by way of hinges 20. The hinges 20 mount along the vertical edges of the doors 16 and permit the doors 16 to rotate between open and closed positions.

A handle 17 attaches near the centerline of the doors 16. The handle 17 enables a user to pull the doors 16 open or push them closed. In some embodiments, a lock mechanism installs adjacent to the handle 17 to secure the doors 16 in a closed configuration.

The view of FIG. 11 illustrates the exterior-facing surfaces of the doors 16, which collectively cover the front face of the retail display system 10 in the closed configuration. In certain embodiments, the doors 16 consist of flat, planar panels without recessed sections or protruding members. In other embodiments, the doors 16 include apertures, windows, or transparent portions to allow visual access to the interior of the retail display system 10.

Figure 12:
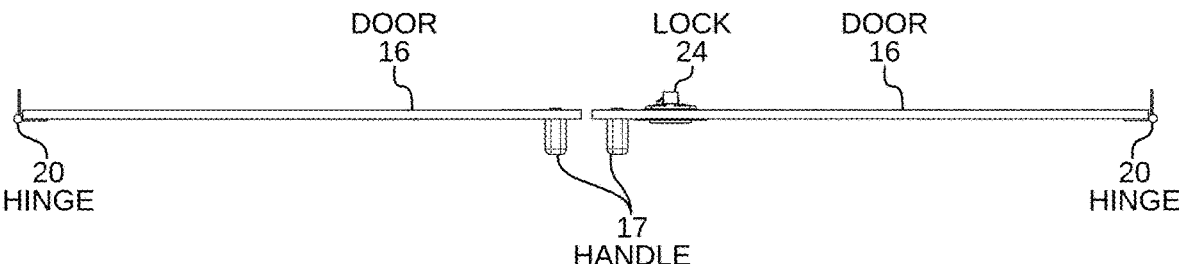
FIG. 12 is a top view diagram of the doors 16 including a handle 17 and a lock 24.

FIG. 12 is a top view diagram of a pair of doors 16 of the retail display system 10. Each door 16 attaches to a corresponding side panel 13 by way of hinges 20 located along the vertical edges of the doors 16. The hinges 20 permit the doors 16 to rotate outward and inward relative to the side panels 13.

A handle 17 mounts to the front face of one of the doors 16. The handle 17 projects outward to allow a user to grasp and operate the doors 16. A lock 24 is positioned proximate to the handle 17 and enables the user to secure the doors 16 in a closed configuration.

The top view illustrates the generally planar arrangement of the doors 16 without additional protruding ribs or recessed features. In certain embodiments, the doors 16 consist solely of flat body panels with the hinges 20, handle 17, and lock 24 as shown. In other embodiments, the doors 16 incorporate transparent or partially transparent portions to allow visibility into the retail display system 10 while maintaining the locking functionality.

Figure 13:
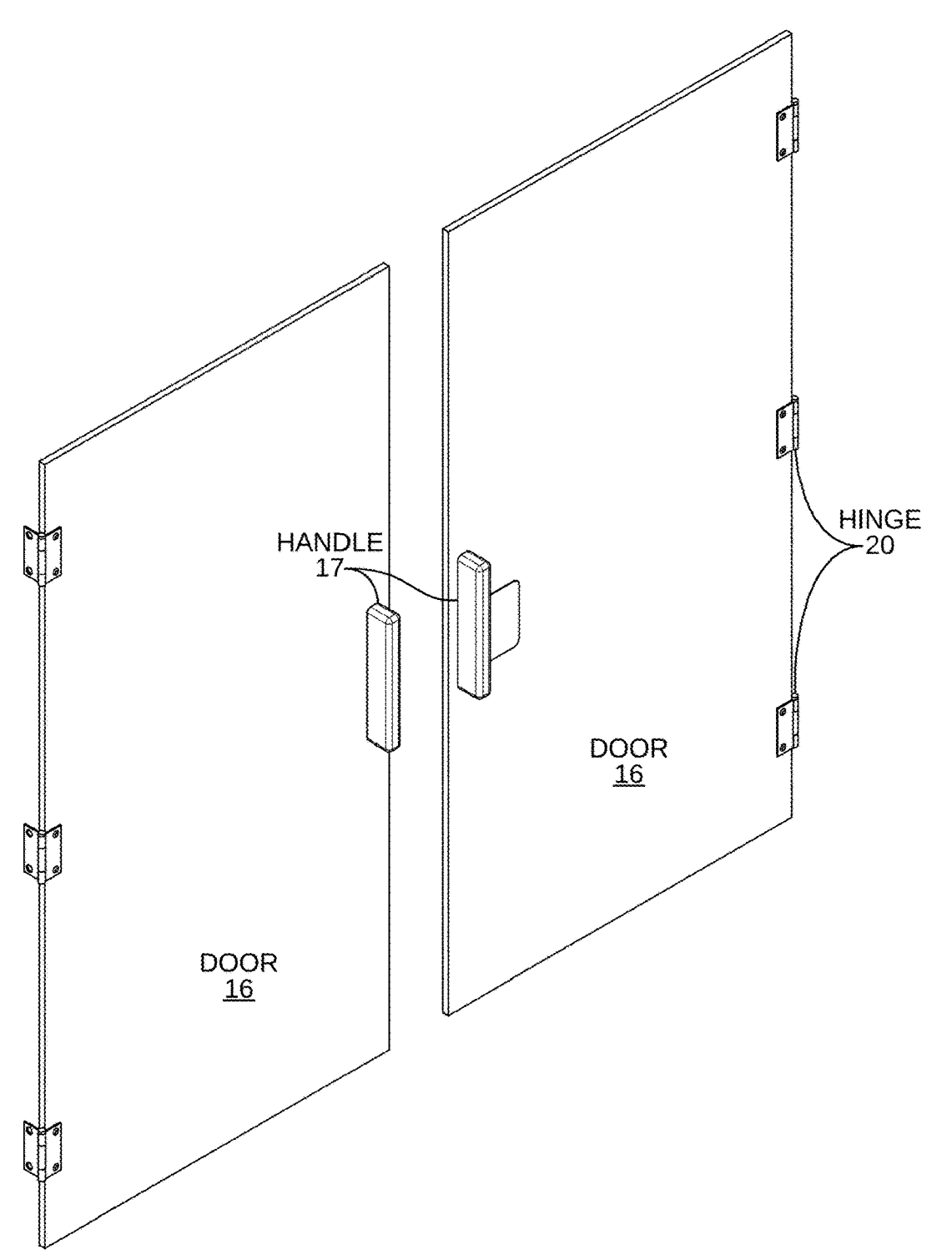
FIG. 13 is a perspective diagram of the doors 16.

FIG. 13 is a perspective diagram of a pair of doors 16 of the retail display system 10. Each door 16 attaches to a corresponding side panel 13 by way of hinges 20. The hinges 20 mount along the vertical edges of the doors 16 and permit rotation between open and closed configurations.

A handle 17 mounts to the exterior face of one of the doors 16 near the vertical centerline. The handle 17 projects outward to provide a grip surface for a user to actuate the doors 16. The perspective view illustrates the relative positions of the hinges 20 and the handle 17 when the doors 16 are in an open configuration.

In certain embodiments, the doors 16 consist of flat, planar members with hinges 20 and handle 17 as the only protruding features. In other embodiments, the doors 16 incorporate optional locking mechanisms, transparent windows, or recessed grip portions. In further embodiments, the doors 16 omit any additional structural reinforcement ribs or brackets, such that the hinges 20 alone secure the doors 16 to the side panels 13.

Figures 14A, 14B, 14C:
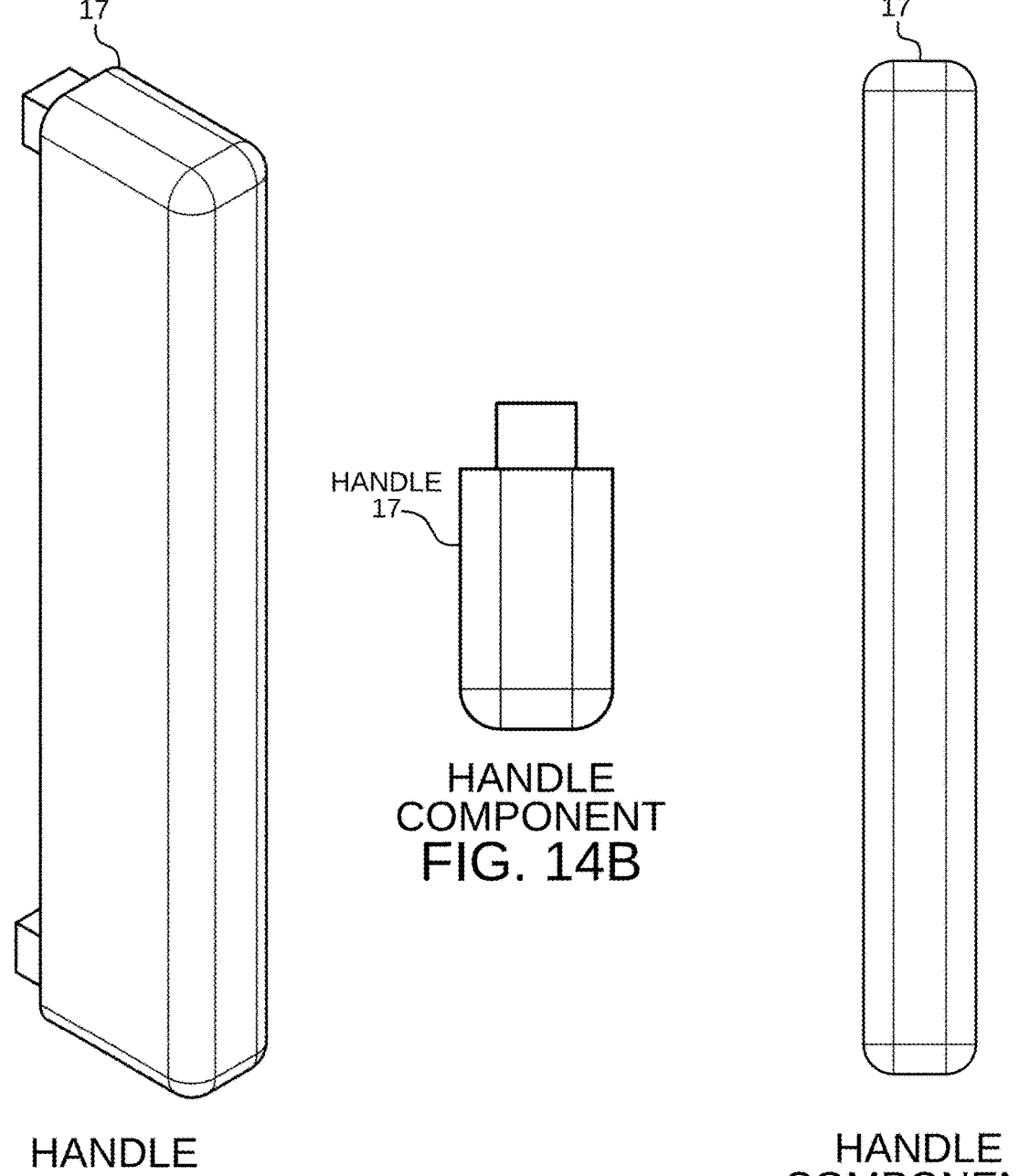
FIGS. 14A-14C are diagrams of a handle 17.

FIGS. 14A-14C are diagrams of a handle 17 used with the doors 16 of the retail display system 10. FIG. 14A shows a perspective view of the handle 17. FIG. 14B shows a front view of the handle 17. FIG. 14C shows a side view of the handle 17.

The handle 17 defines an elongated body configured to project outward from the surface of the door 16. The handle 17 provides a grip surface for the user to pull the doors 16 open or push them closed. The handle 17 mounts to the exterior face of a door 16 proximate to the vertical centerline, as shown in earlier figures.

In certain embodiments, the handle 17 consists of a rigid bar with flat side faces and rounded end portions. In other embodiments, the handle 17 incorporates ergonomic contours or textured surfaces to improve grip. In further embodiments, the handle 17 attaches directly to the door 16 using fasteners inserted from the rear side of the door panel, while in alternative embodiments the handle 17 mounts with surface brackets or adhesive bonding.

In some configurations, the handle 17 consists of a single continuous body as shown, without additional protrusions, recessed grip portions, or auxiliary mounting brackets. This configuration provides a minimal structure while maintaining sufficient rigidity for repeated operation of the doors 16.

FIGS. 15A-15C are diagrams of a wheel 21 used with the base panel 11 of the retail display system 10. FIG. 15A shows a perspective view of the wheel 21. FIG. 15B shows a top view of the wheel 21. FIG. 15C shows a front view of the wheel 21.

The wheel 21 includes a rotatable roller mounted to a support bracket. The bracket attaches to the underside of the base panel 11 and allows the retail display system 10 to roll along a floor surface. The wheel 21 includes a mounting plate with multiple fastener apertures to secure the wheel 21 to the base panel 11.

In certain embodiments, the wheel 21 comprises a swivel caster that rotates about a vertical axis, allowing multidirectional rolling. In other embodiments, the wheel 21 is fixed and restricts movement to a single rolling axis. In further embodiments, the wheel 21 includes a locking feature that prevents rolling when engaged. In some configurations, the wheel 21 consists only of the roller and bracket shown, without additional suspension arms, springs, or shock-absorbing components.

The arrangement of FIGS. 15A-15C illustrates that the wheel 21 attaches directly to the base panel 11 without requiring a separate chassis or frame. This configuration preserves the flat-pack nature of the retail display system 10 while providing mobility in the assembled configuration.

FIGS. 16A-16C are diagrams of a threaded fastener 18 used with the retail display system 10. FIG. 16A shows a perspective view of the threaded fastener 18. FIG. 16B shows a top view of the threaded fastener 18. FIG. 16C shows a side view of the threaded fastener 18.

The threaded fastener 18 includes a head portion and a threaded shank. The head portion defines a drive feature configured to receive a tool such as a screwdriver. The threaded shank inserts through pre-drilled apertures 22 of the panels and secures adjoining components together. The threaded fastener 18 thereby attaches shelf panels 15, side panels 13, and back panel 14 to the base panel 11 during assembly of the retail display system 10.

In certain embodiments, the threaded fastener 18 includes a countersunk head that lies flush with the surface of the adjoining panel. In other embodiments, the threaded fastener 18 includes a domed head that projects outward. In further embodiments, the threaded fastener 18 consists of a single-piece body without washers, lock rings, or other auxiliary components. This configuration reduces part count and preserves the flat-pack nature of the retail display system 10.

The threaded fastener 18 provides a removable and reusable connection. The use of pre-drilled apertures 22 in combination with the threaded fastener 18 enables straightforward assembly and disassembly of the retail display system 10 without specialized tools.

Figure 17:
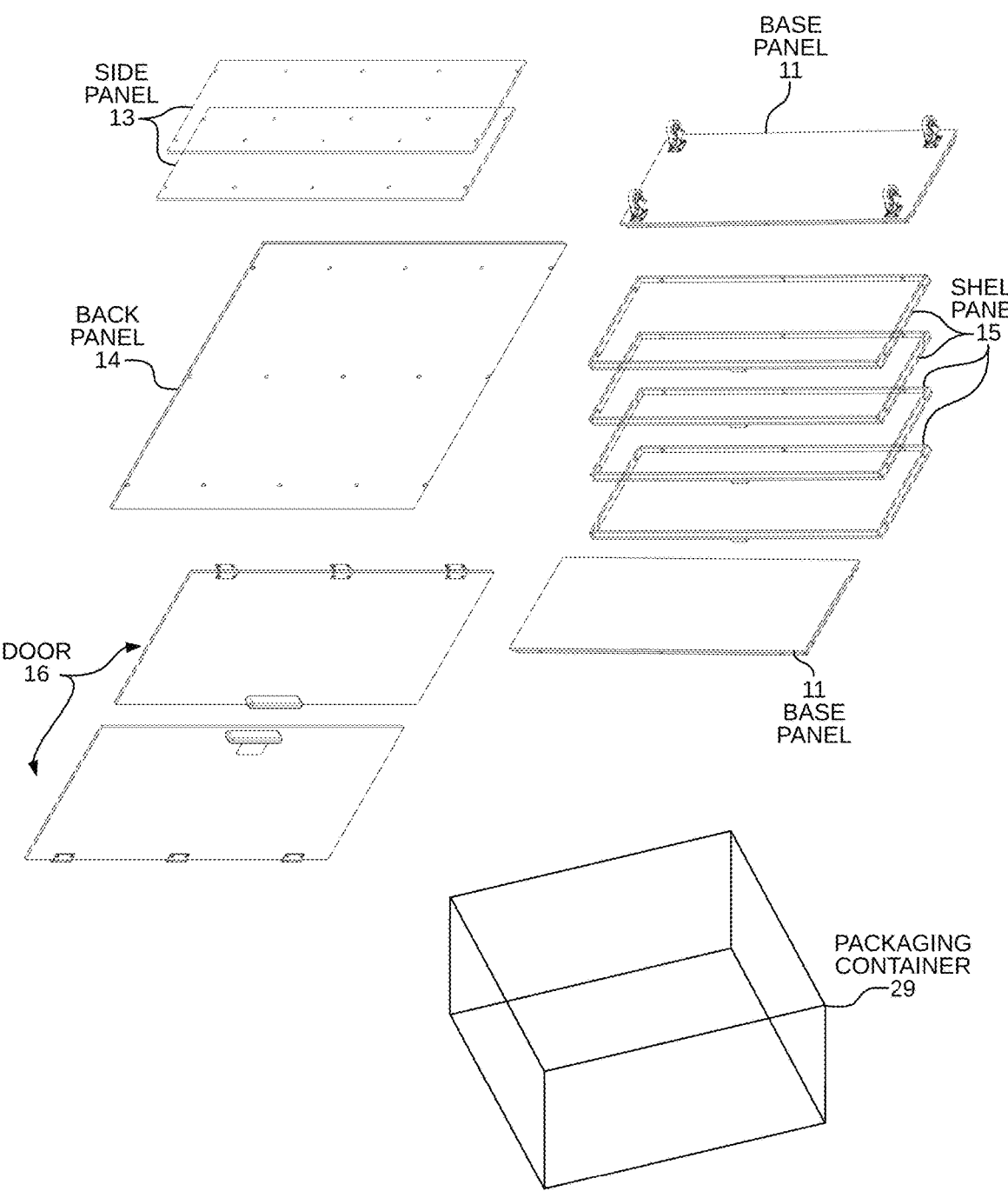
FIG. 17 is a perspective exploded diagram of all panels of the retail display system 10 in a disassembled configuration with a packaging container 29.

FIG. 17 is a perspective diagram of all panels of the retail display system 10 in a disassembled configuration. The panels include a base panel 11, a second base panel 11, a pair of side panels 13, a back panel 14, a plurality of shelf panels 15, and a pair of doors 16. Each of these panels separates from the others to allow compact storage and shipment.

A packaging container 29 receives all of the panels in a flat orientation. The panels stack within the packaging container 29 such that the dimensions of the container 29 are smaller than those of the assembled retail display system 10. This arrangement allows the retail display system 10 to ship in a flat-pack configuration and later reassemble into a full retail display system. In this arrangement, each panel forms a substantially planar component that stacks with the other panels to minimize overall package volume.

In certain embodiments, the packaging container 29 includes dimensions not exceeding 1.1 times the length, width, and height of the stacked panels, such that the entire retail display system may be flat-packed into a container of known size. In other embodiments, the packaging container 29 consists of a rectangular cardboard box or plastic case with internal dividers to separate the panels. In further embodiments, the panels fit directly within the packaging container 29 without the inclusion of any secondary frames, ribs, or packaging inserts.

The arrangement of FIG. 17 illustrates that the retail display system 10 disassembles into a small number of planar components that are easy to transport, store, and reassemble.

FIGS. 18A-18F are diagrams showing assembly steps of the retail display system 10.

Figure 18A:
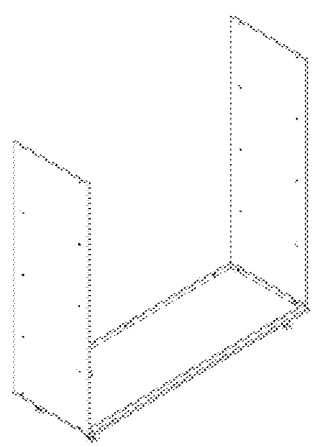
FIGS. 18A-18F are perspective diagrams illustrating assembly steps of the retail display system 10.

FIG. 18A shows a first step in which the pair of side panels 13 attach to a first base panel 11. The end surfaces 31 of the side panels 13 contact the alignment flange 26 of the base panel 11, while the body surfaces 32 of the side panels 13 rest against the raised alignment guides 25. Pre-drilled apertures 22 in the side panels 13 align with corresponding apertures in the base panel 11 to receive threaded fasteners 18.

Figure 18B:
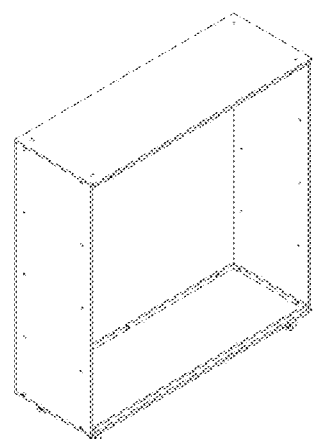

FIG. 18B shows attachment of a second base panel 11 opposite the first base panel 11. The second base panel 11 engages the end surfaces 31 and body surfaces 32 of the side panels 13 in the same manner, completing a rectangular frame.

Figure 18C:
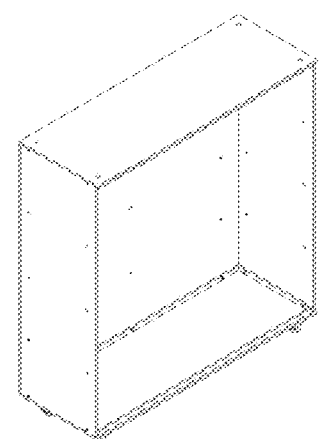

FIG. 18C shows attachment of the back panel 14. The back panel 14 abuts the alignment flange 26 and raised alignment guides 25 of the base panels 11 to ensure perpendicular alignment. Pre-drilled apertures 22 in the back panel 14 align with apertures in the base panels 11 and side panels 13 to receive fasteners.

Figure 18D:
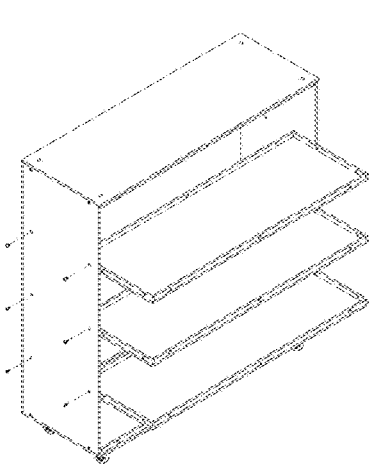

FIG. 18D shows insertion of the shelf panels 15. Each shelf panel 15 spans between the side panels 13, with raised alignment guides 25 positioning the shelf panel 15 against the body surfaces 32 of the side panels 13. Fasteners extend through pre-drilled shelf apertures 23 to secure the shelf panels 15 in place.

Figure 18E:
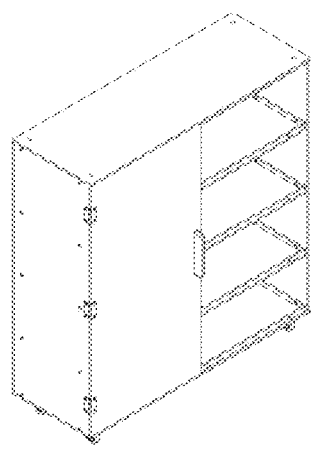

FIG. 18E shows attachment of a pair of doors 16 by way of hinges 20 mounted along the vertical edges of the side panels 13. A handle 17 attaches to the front of the doors 16 to permit user operation.

Figure 18F:
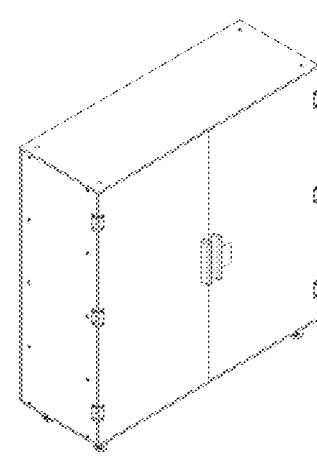

FIG. 18F shows the retail display system 10 in an assembled configuration with the doors 16 closed. The wheels 21 mounted to the underside of the first base panel 11 support the structure above a floor surface and provide mobility.

Figure 19A:
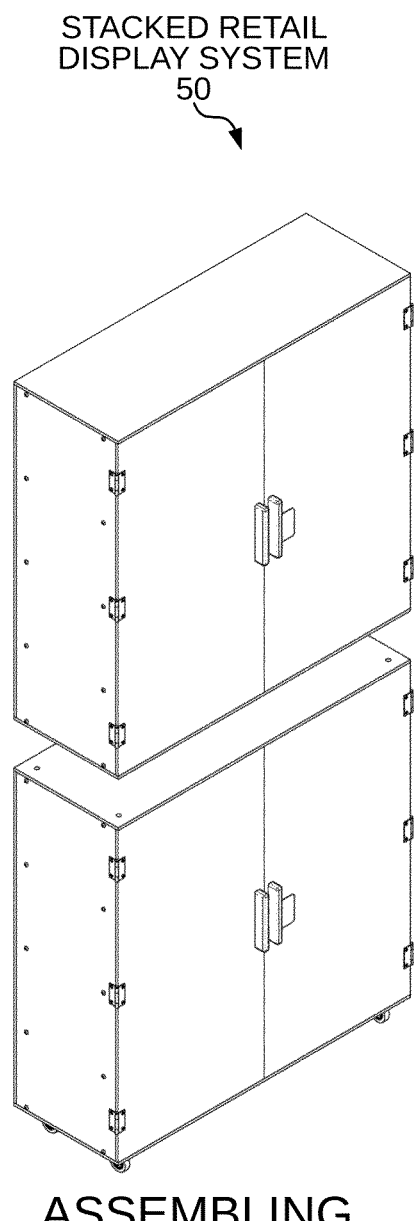
FIGS. 19A and 19B are perspective diagrams of the stacked retail display system 50.

FIG. 19A is a perspective diagram of two retail display systems 10 being assembled into a stacked retail display system 50. A first retail display system 10 rests on the floor surface, while a second retail display system 10 positions above it. The lower base panel 11 of the upper unit aligns with the upper base panel 11 of the lower unit. The alignment features of the base panels 11 cooperate to secure the stacked configuration without requiring additional external frames or brackets.

Figure 19B:
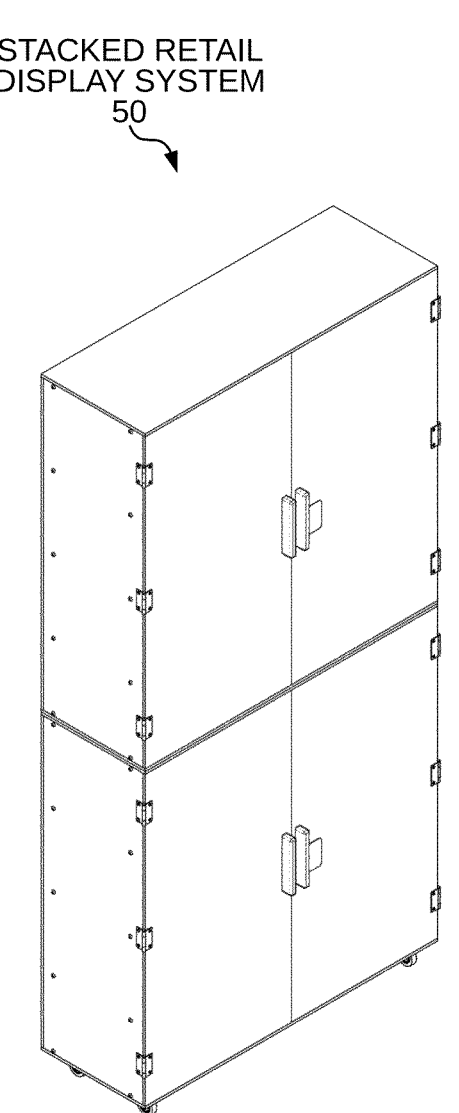

FIG. 19B is a perspective diagram of the stacked retail display system 50 in its assembled configuration. The stacked retail display system 50 presents four doors 16 across its front face, each set of doors mounted by hinges 20 and operable by corresponding handles 17. The stacking configuration increases the available vertical display space while preserving the modular nature of the retail display system 10.

In certain embodiments, the stacked retail display system 50 relies solely on the alignment guides 25 and alignment flanges 26 of the base panels 11 for stability. In other embodiments, the stacked configuration incorporates mechanical fasteners to further secure the upper and lower units. In further embodiments, the stacked retail display system 50 includes more than two units combined vertically, providing scalable storage and display capacity. In some configurations, the stacked system omits additional stabilizers, ribs, or crossbars, relying only on the base panel interfaces to maintain alignment.

Figure 20:
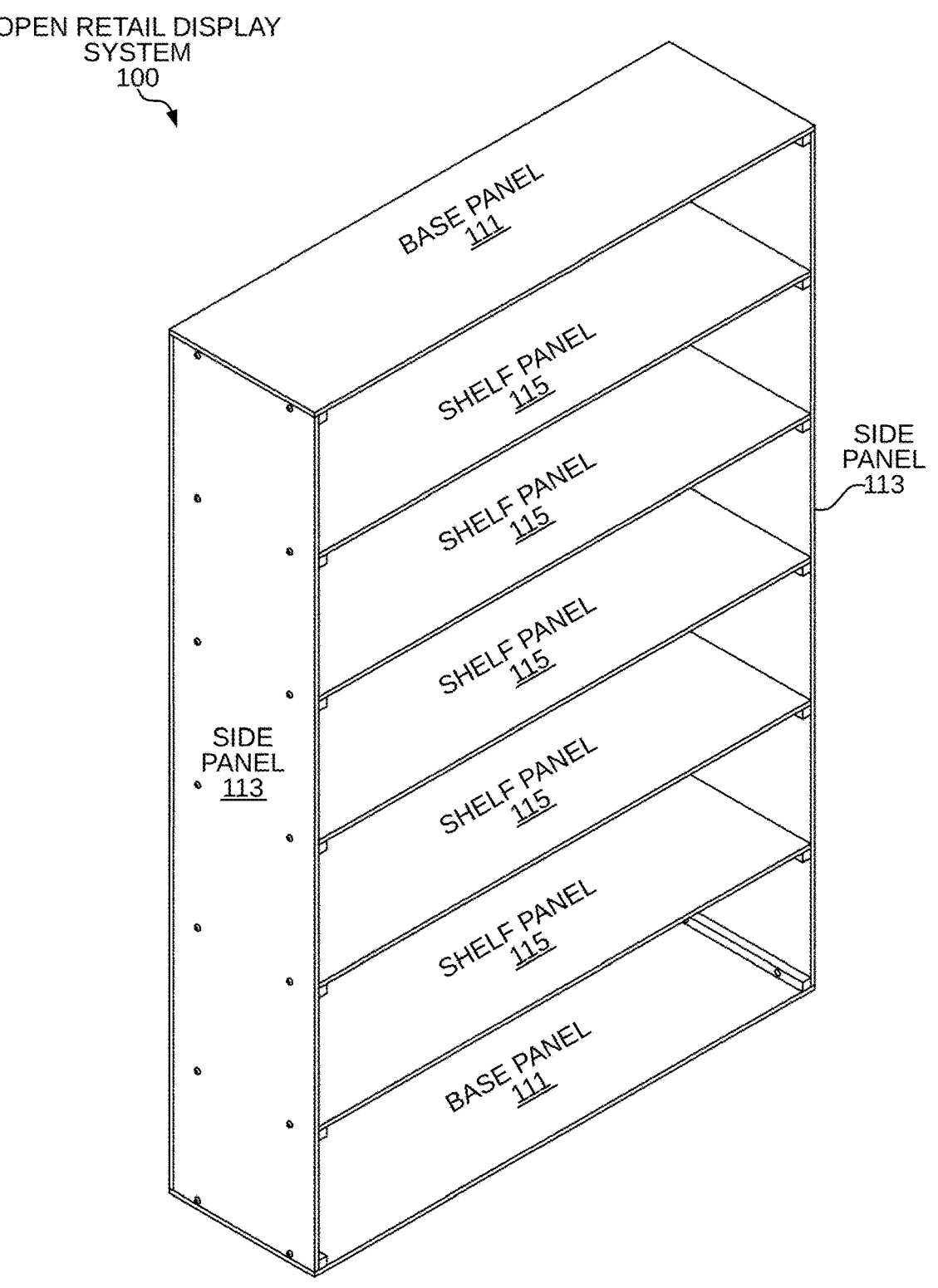
FIG. 20 is a perspective diagram of an open retail display system 100 in an assembled configuration.

FIG. 20 is a perspective diagram of an open retail display system 100 in an assembled configuration in accordance with another embodiment. The open retail display system 100 includes a pair of base panels 111, a pair of side panels 113, and a plurality of shelf panels 115. The base panels 111 secure to opposing ends of the side panels 113 to form the top and bottom boundaries of the system. The shelf panels 115 span laterally between the side panels 113 and provide horizontal support surfaces for displaying retail goods.

Unlike the retail display system 10 shown in earlier figures, the open retail display system 100 omits doors and hinges. The omission of front-facing closure panels produces an open configuration that allows continuous access to the displayed goods.

In certain embodiments, the open retail display system 100 includes five shelf panels 115 as shown. In other embodiments, the number of shelf panels 115 is reduced or increased. In further embodiments, the shelf panels 115 attach to the side panels 113 using threaded fasteners extending through pre-drilled apertures, while in alternative embodiments the shelf panels 115 rest in press-fit engagement with alignment flanges of the base panels 111.

The open retail display system 100 demonstrates that the flat-pack construction accommodates both closed configurations with doors and open configurations without doors. This flexibility allows the system to serve as either an enclosed cabinet or an open shelving unit.

In certain embodiments, the assembly proceeds in the order shown, while in other embodiments the shelf panels 15 and doors 16 install in a different sequence. In further embodiments, the retail display system 10 assembles without the doors 16, leaving the front face open. The assembly sequence requires only the fasteners 18 and the pre-drilled apertures 22 shown, without additional brackets, clips, or adhesives.

Figure 21:
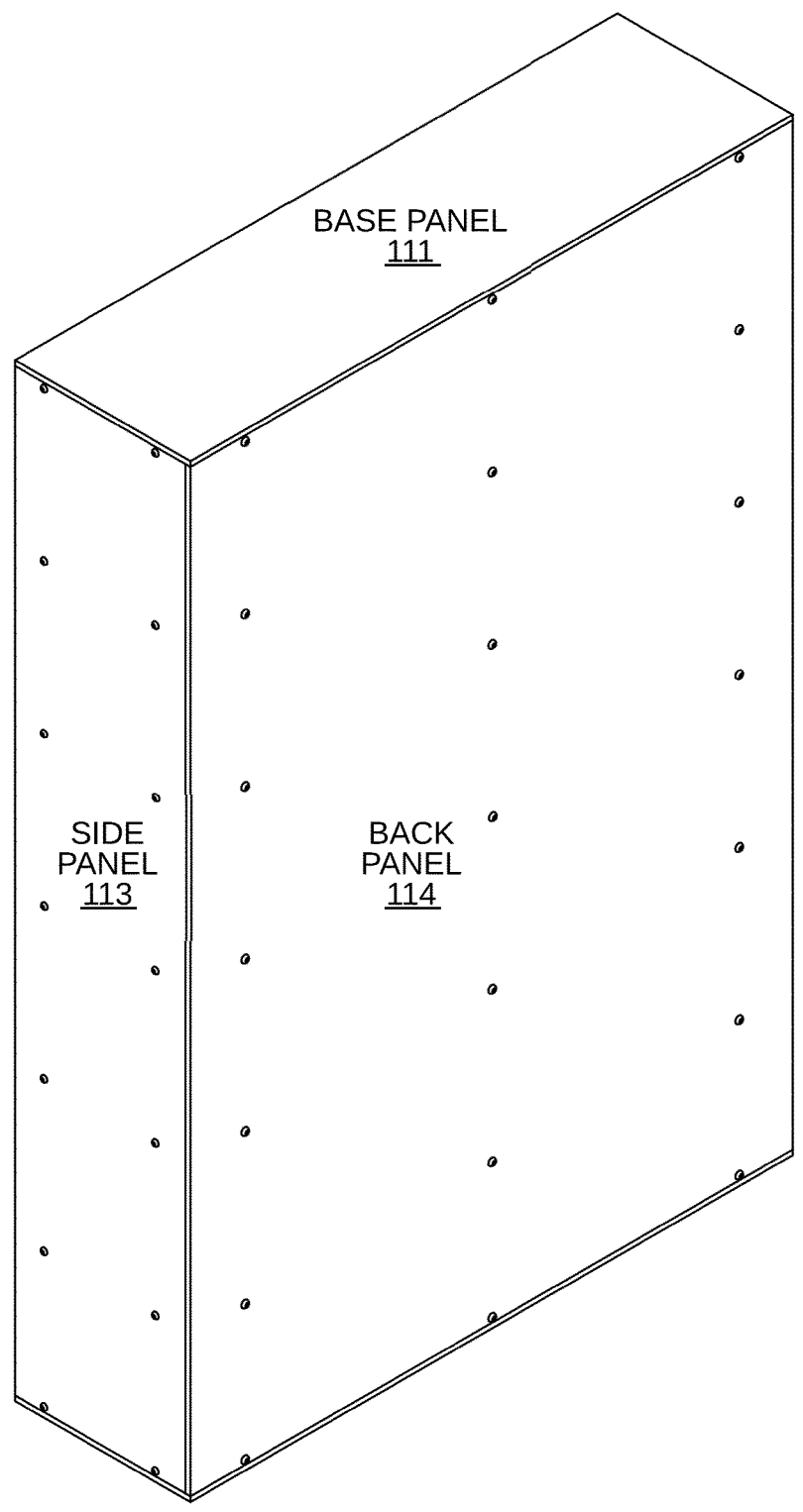
FIG. 21 is a rear perspective diagram of the open retail display system 100 in the assembled configuration.

FIG. 21 is a rear perspective diagram of an open retail display system 100 in the assembled configuration. The open retail display system 100 includes a base panel 111, a back panel 114, and a pair of side panels 113. The back panel 114 spans across the rear of the structure to enclose the back face of the system.

The back panel 114 attaches to the base panel 111 and the side panels 113 using pre-drilled apertures and threaded fasteners. The end surfaces of the back panel 114 contact the alignment flanges of the base panel 111, while the body surface of the back panel 114 rests against raised alignment guides of the base panel 111. This cooperation ensures perpendicular orientation and reliable positioning during assembly.

In certain embodiments, the back panel 114 includes apertures arranged across both its perimeter and central region, providing multiple attachment options for shelf panels 115. In other embodiments, the back panel 114 includes only perimeter apertures to simplify manufacturing. In further embodiments, the back panel 114 consists of a single flat body without reinforcement ribs or secondary structural features, relying on the raised alignment guides and alignment flanges of the base panel 111 for structural integrity.

Figure 22A:
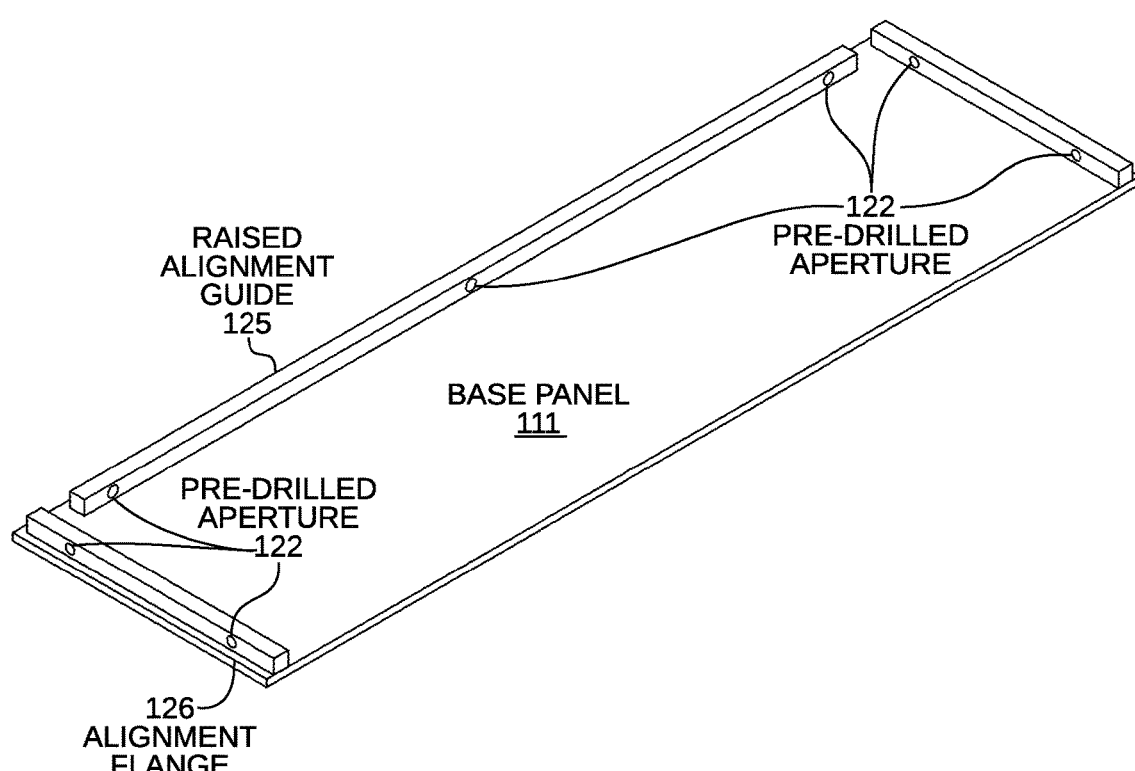
FIG. 22A is a perspective diagram of a base panel 111 of the open retail display system 100.
Figure 22A:

FIG. 22A is a perspective diagram of a base panel 111 of the open retail display system 100. The base panel 111 includes a plurality of pre-drilled apertures 122 distributed along its perimeter. A series of raised alignment guides 125 extend upward from the surface of the base panel 111. Each raised alignment guide 125 cooperates with an alignment flange 126 formed at the edge of the base panel 111. Together, the raised alignment guides 125 and alignment flanges 126 receive adjoining panels such as the side panels 113 and back panel 114, ensuring precise alignment during assembly.

Figure 22B:
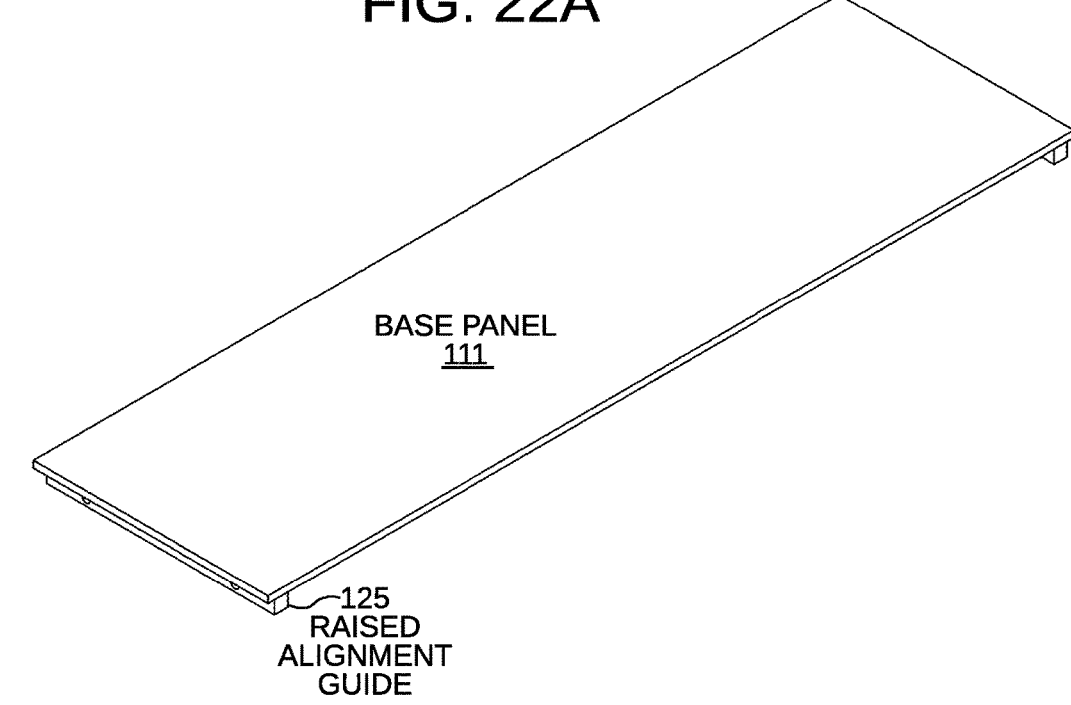
FIG. 22B is another perspective diagram of the base panel 111.

FIG. 22B is another perspective diagram of the base panel 111, illustrating the raised alignment guides 125 projecting from its upper surface. The raised alignment guides 125 form vertical contact features that stabilize adjoining side and back panels against the body surface of the base panel 111.

In certain embodiments, the base panel 111 includes raised alignment guides 125 and alignment flanges 126 along all four sides. In other embodiments, the alignment features extend along only a subset of the edges, such as the lateral or rear edges. In further embodiments, the raised alignment guides 125 extend upward by less than one-quarter of the thickness of the adjoining panel, while the alignment flanges 126 extend inward by a distance greater than the width of the raised alignment guides 125. In some configurations, the base panel 111 includes only the raised alignment guides 125, alignment flanges 126, and pre-drilled apertures 122 shown, without additional grooves, ribs, or protruding members.

This configuration ensures that the base panel 111 provides both alignment and fastening functions, simplifying assembly of the open retail display system 100 while preserving its flat-pack characteristics.

Figure 23A:
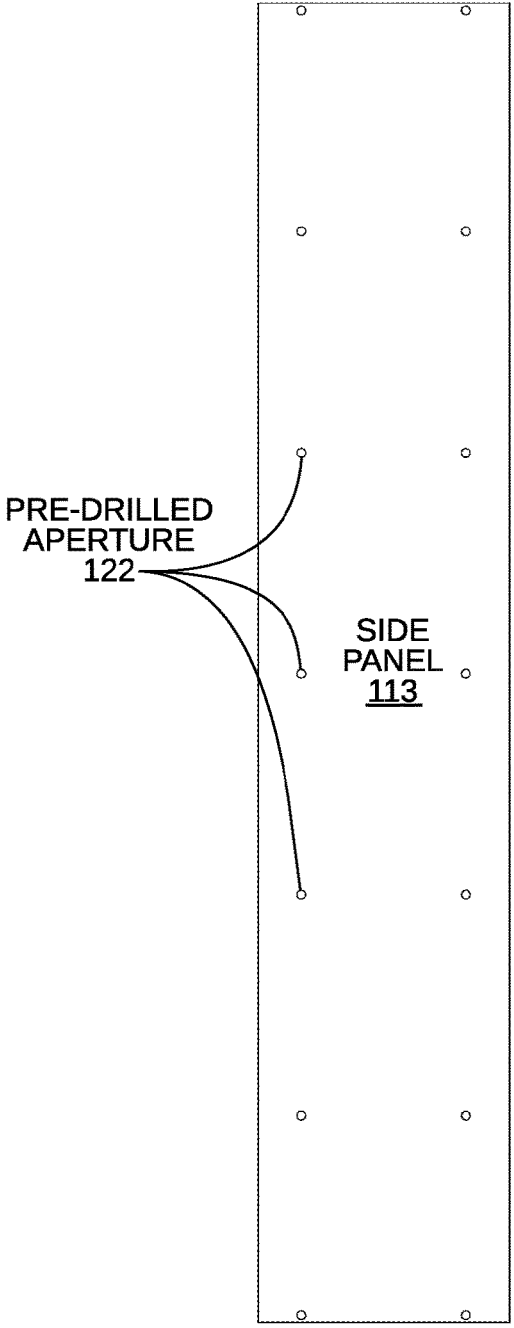
FIG. 23A is a front view diagram of a side panel 113 of the open retail display system 100.

FIG. 23A is a front view diagram of a side panel 113 of the open retail display system 100. The side panel 113 includes a plurality of pre-drilled apertures 122 arranged along its vertical length. The apertures 122 align with corresponding apertures in the base panels 111, shelf panels 115, and back panel 114 to receive threaded fasteners. The aperture arrangement enables the user to secure shelf panels 115 at different vertical positions, allowing customization of shelf spacing.

Figure 23B:
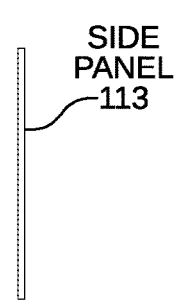
FIG. 23B is a side view diagram of the side panel 113.

FIG. 23B is a side view diagram of the side panel 113. The side view illustrates the planar body of the side panel 113 and the thickness defined between its opposed surfaces. The end surface of the side panel 113 abuts the alignment flange 126 of the base panel 111, while the body surface rests against the raised alignment guides 125, thereby ensuring perpendicular alignment during assembly.

In certain embodiments, the side panel 113 includes pre-drilled apertures 122 distributed continuously along its height. In other embodiments, the apertures 122 are confined to selected zones to reduce part count. In further embodiments, the side panel 113 is a flat planar member without recessed grooves, protruding ribs, or integrated brackets, relying instead on cooperation with the raised alignment guides 125 and alignment flanges 126 of the base panel 111 for secure positioning.

Figure 24A:
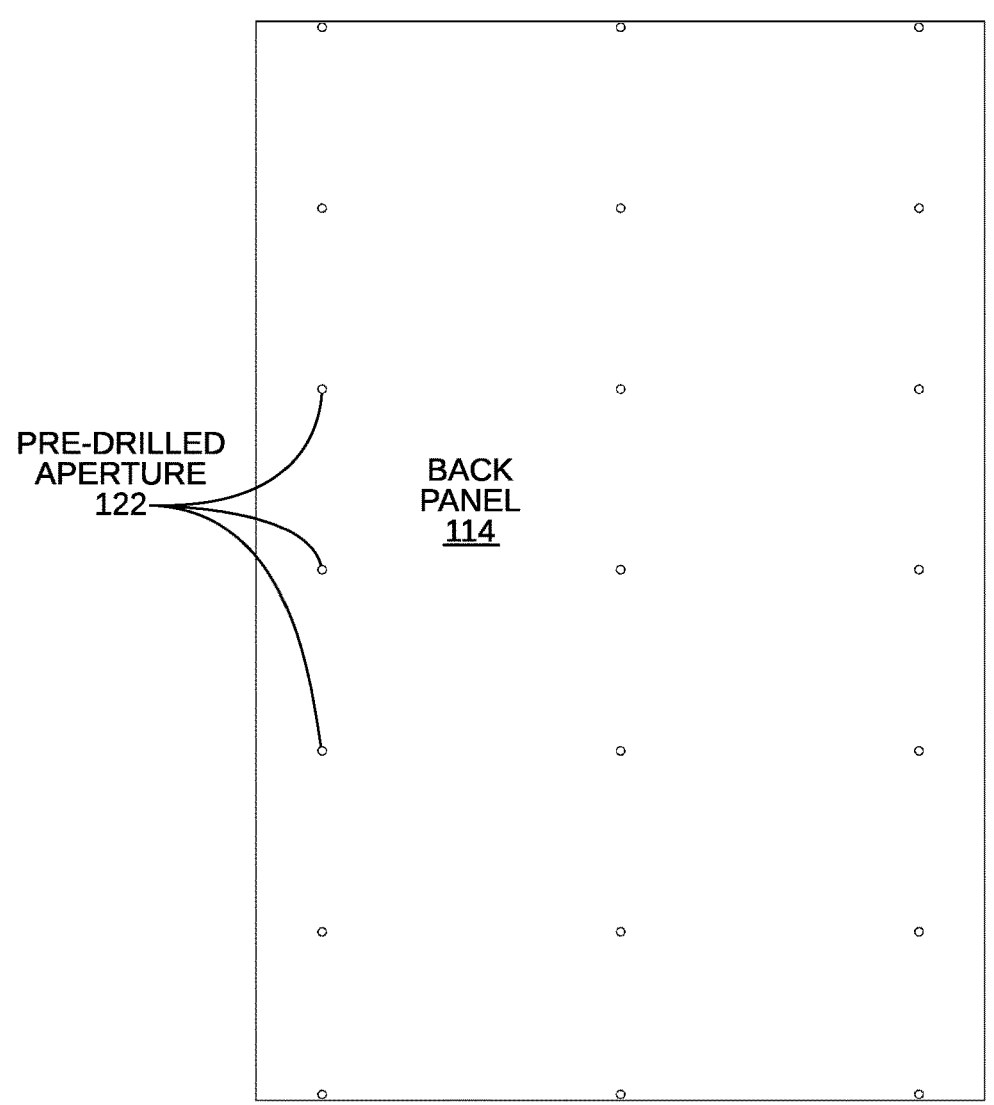
FIG. 24A is a front view diagram of a back panel 114 of the open retail display system 100.

FIG. 24A is a front view diagram of a back panel 114 of the open retail display system 100. The back panel 114 includes a series of pre-drilled apertures 122 distributed across its surface. The apertures 122 align with corresponding apertures in the side panels 113 and base panels 111, allowing threaded fasteners 18 to secure the back panel 114 to the system. The placement of the apertures 122 also enables attachment of shelf panels 115 at various vertical positions, supporting customizable shelf spacing.

Figure 24B:
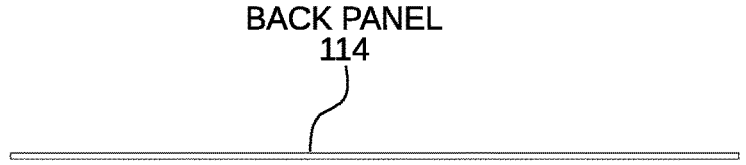
FIG. 24B is a side view diagram of the back panel 114.

FIG. 24B is a side view diagram of the back panel 114. The side view illustrates the thickness of the back panel 114 and its generally planar profile. The end surfaces of the back panel 114 seat against the alignment flanges 126 of the base panels 111, while the body surface of the back panel 114 rests against raised alignment guides 125. This cooperation of alignment features ensures perpendicular orientation between the back panel 114 and the adjoining panels.

In certain embodiments, the back panel 114 includes a full array of apertures 122 across its width and height, enabling maximum shelf positioning flexibility. In other embodiments, the apertures 122 are confined to perimeter regions or discrete zones. In further embodiments, the back panel 114 is a single planar sheet without ribs, brackets, or recesses, thereby simplifying manufacture while relying on the alignment features of the base panels 111 for accurate positioning.

Figure 25:
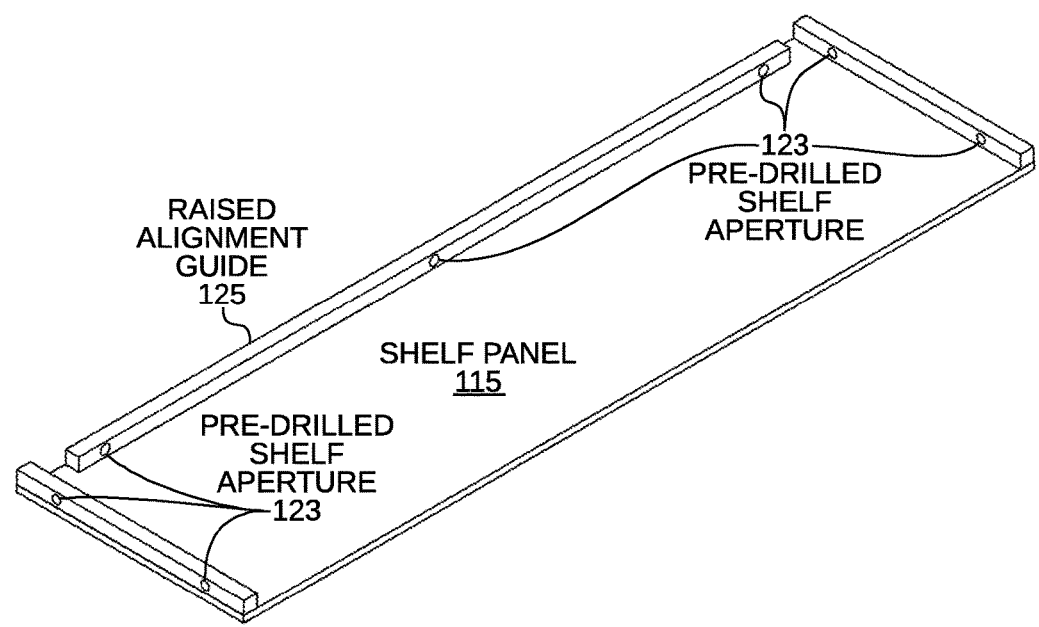
FIG. 25 is a perspective diagram of a shelf panel 115 of the open retail display system 100.

FIG. 25 is a perspective diagram of a shelf panel 115 of the open retail display system 100. The shelf panel 115 includes a plurality of pre-drilled shelf apertures 123 positioned proximate to its perimeter. The apertures 123 align with corresponding apertures in the side panels 113, enabling the shelf panel 115 to secure in place using threaded fasteners.

The shelf panel 115 further includes a series of raised alignment guides 125 projecting from its surface. Each raised alignment guide 125 cooperates with adjoining side panels 113 or back panel 114 to ensure perpendicular orientation and accurate positioning during installation. An alignment flange 126 extends along the edges of the shelf panel 115 to contact the end surfaces of adjoining panels and provide lateral stability.

In certain embodiments, the shelf panel 115 attaches using only the pre-drilled shelf apertures 123, omitting adhesives or brackets. In other embodiments, the raised alignment guides 125 extend upward by a height less than the thickness of the shelf panel 115, creating minimal intrusion while still providing alignment functionality. In further embodiments, the shelf panel 115 consists of a single planar member with only the raised alignment guides 125, alignment flange 126, and apertures 123 as shown, without ribs, recesses, or other protruding features.

Figure 26A:
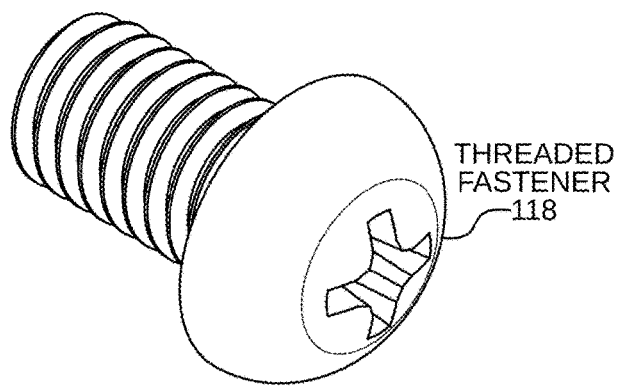
FIGS. 26A-26C are diagrams of a threaded fastener 118.
Figure 26B:
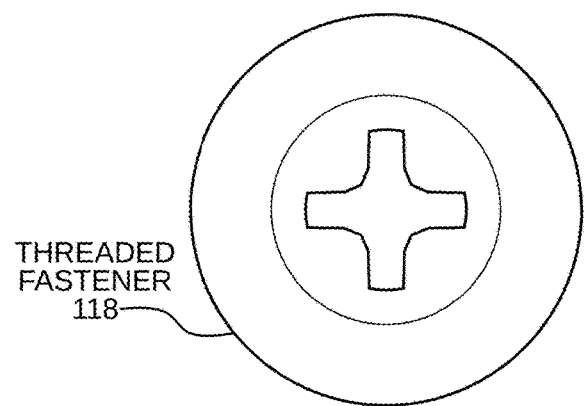
Figure 26C:
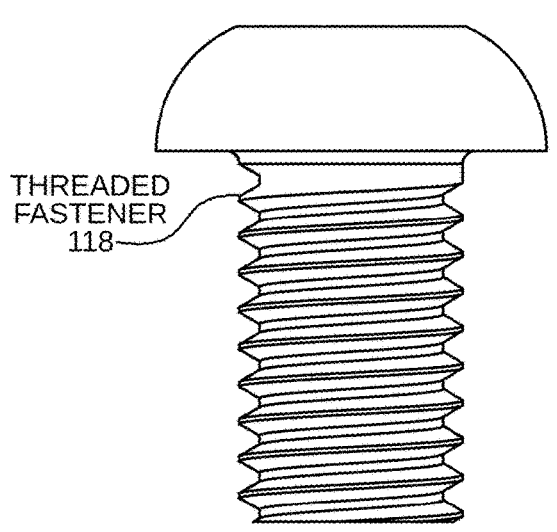

FIGS. 26A-26C are diagrams of a threaded fastener 118 used with the open retail display system 100. FIG. 26A shows a perspective view of the threaded fastener 118. FIG. 26B shows a top view of the threaded fastener 118. FIG. 26C shows a side view of the threaded fastener 118.

The threaded fastener 118 includes a head portion and a threaded shank. The head portion defines a drive feature configured to receive a tool such as a screwdriver. The threaded shank inserts through pre-drilled apertures 122 in the side panels 113, back panel 114, and base panels 111 to secure adjoining components of the open retail display system 100.

In certain embodiments, the threaded fastener 118 includes a countersunk head that lies flush with the surface of the panel. In other embodiments, the threaded fastener 118 includes a domed head projecting outward. In further embodiments, the threaded fastener 118 consists of a single-piece body without washers, lock rings, or other auxiliary components, thereby preserving the flat-pack efficiency of the open retail display system 100.

The threaded fastener 118 provides a removable and reusable connection that allows disassembly and reassembly of the system without permanent deformation of the panels. The use of pre-drilled apertures 122 in combination with the threaded fastener 118 enables straightforward assembly with only basic tools.

Figure 27:
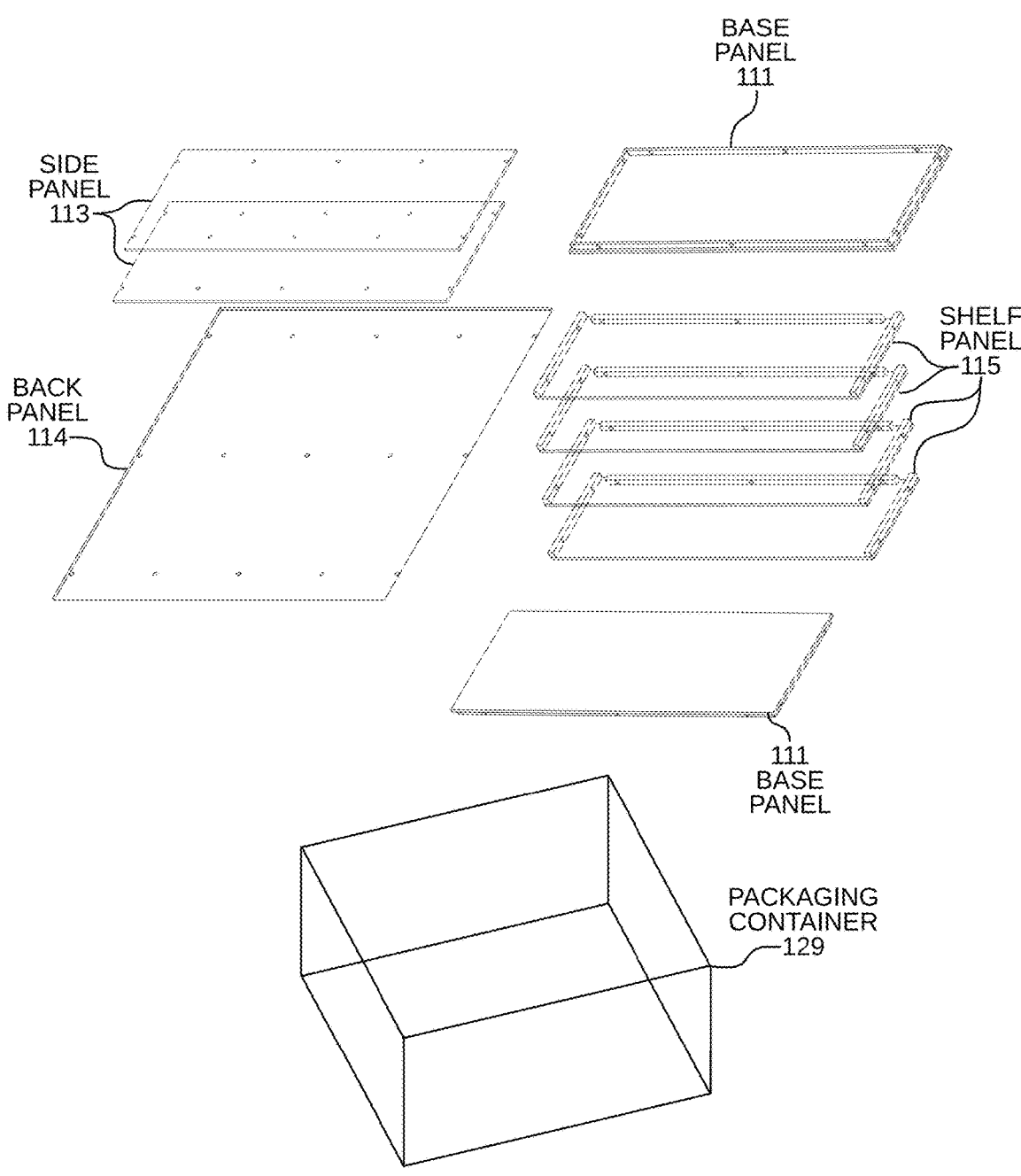
FIG. 27 is a perspective exploded diagram of all panels of the open retail display system 100 in a disassembled configuration with a packaging container 129.

FIG. 27 is a perspective diagram of all panels of another embodiment of the open retail display system 100 in a disassembled configuration. The panels include a pair of base panels 111, a pair of side panels 113, a back panel 114, and a plurality of shelf panels 115. Each panel separates from the others to enable compact storage and shipment. In this disassembled configuration, each panel is a component that stacks with the other panels to minimize package volume.

A packaging container 129 receives the panels in a flat, stacked orientation. The packaging container 129 defines dimensions smaller than those of the assembled open retail display system 100, enabling the entire system to ship in a flat-pack configuration. The panels nest within the container 129 without requiring additional reinforcement ribs or internal frames.

In certain embodiments, the packaging container 129 consists of a rectangular box formed from corrugated cardboard. In other embodiments, the packaging container 129 includes a molded plastic housing with compartments sized for each panel. In further embodiments, the dimensions of the packaging container 129 are no greater than 1.1 times the length, width, and height of the stacked panels, ensuring that the open retail display system may be consistently flat-packed into a container of known size.

The arrangement of FIG. 27 demonstrates that the open retail display system 100 disassembles into a small number of planar components, enabling quick shipment, efficient storage, and reassembly at the point of use.

FIGS. 28A-28D are perspective diagrams illustrating assembly steps of the open retail display system 100.

Figure 28A:
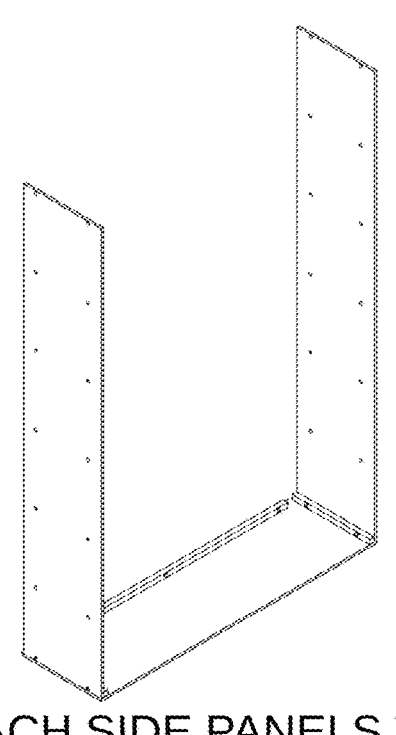
FIGS. 28A-28D are perspective diagrams illustrating assembly steps of the open retail display system 100.

In FIG. 28A, a pair of side panels 113 attach to a first base panel 111, with the end surfaces of the side panels 113 contacting the alignment flanges of the base panel 111 and the body surfaces of the side panels 113 resting against the raised alignment guides.

Figure 28B:
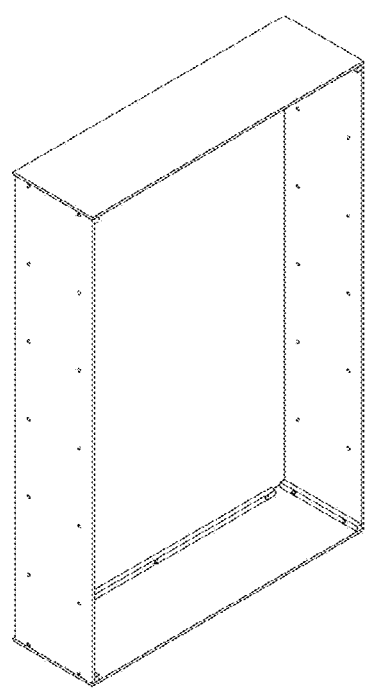

In FIG. 28B, a second base panel 111 attaches to the upper ends of the side panels 113.

Figure 28C:
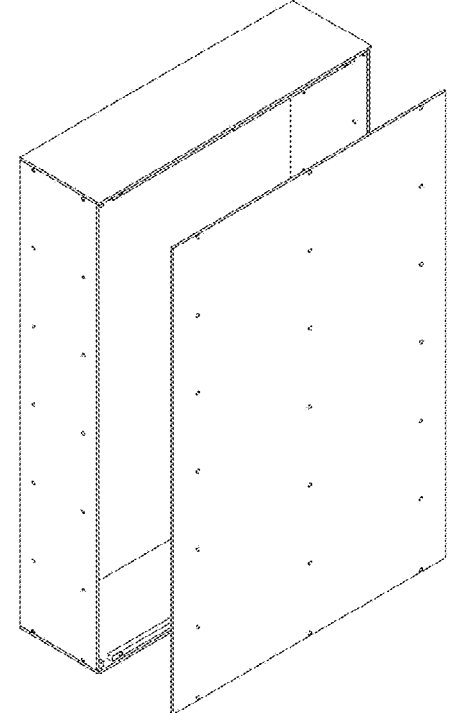

In FIG. 28C, a back panel 114 then attaches across the rear edges of the base panels 111 and side panels 113, using pre-drilled apertures 122 to receive threaded fasteners 118.

Figure 28D:
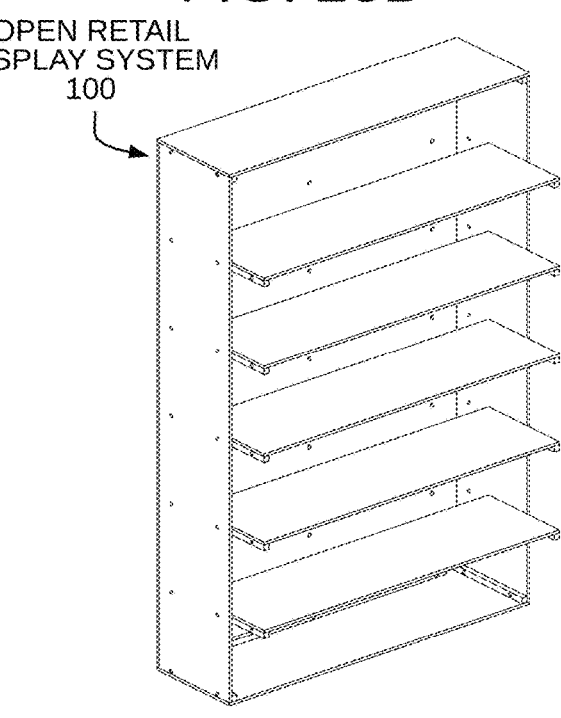

In FIG. 28D, a plurality of shelf panels 115 attach between the side panels 113, each shelf panel 115 positioned at a user-selected vertical height. The pre-drilled shelf apertures 123 align with apertures in the side panels 113, permitting secure fastening. The assembly yields the open retail display system 100 in its completed configuration, with multiple horizontal shelf surfaces accessible from the open front.

In certain embodiments, the assembly requires only the alignment guides 125 and flanges 126 to position the panels before fastening. In other embodiments, the assembly includes additional stabilizers such as dowels or brackets. In further embodiments, the open retail display system 100 assembles entirely without adhesives or welding, relying solely on the pre-drilled apertures 122 and threaded fasteners 118.

FIG. 29 is a flowchart of a method 200 of assembling a retail display system.

In a first step (step 201), remove a first base panel, a pair of side panels, a second base panel, and one or more shelf panels from a packaging container. The first and second base panels each include an alignment flange and a raised alignment guide to assist with assembly.

In a second step (step 202), couple the pair of side panels to opposing ends of the first base panel. Position each side panel so that its end surface contacts the alignment flange of the first base panel and its body surface rests against the raised alignment guide of the first base panel.

In a third step (step 203), couple the second base panel to the ends of the side panels opposite the first base panel to form an enclosure. Position each side panel so that its end surface contacts the alignment flange of the second base panel and its body surface rests against the raised alignment guide of the second base panel.

In a fourth step (step 204), insert one or more shelf panels between the side panels to form a shelving structure within the enclosure. The first base panel, the pair of side panels, the second base panel, and the shelf panels fit entirely within the packaging container in a disassembled, flat configuration prior to assembly.

In certain embodiments, attach a back panel to the side panels and base panels using threaded fasteners. In other embodiments, omit the back panel or any doors, leaving the front or rear of the display system open. In further embodiments, stack a second retail display system on top of the first by aligning the alignment features integrated into the base panels.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A retail display system, comprising:
  a first base panel, wherein the first base panel comprises one or more raised alignment guides, wherein the raised alignment guides are offset from an edge of the first base panel and define an alignment flange, and wherein the alignment flange of the first base panel extends an entirety of a perimeter of the first base panel;
  a pair of opposing side panels coupled to the first base panel;
  a second base panel coupled to the side panels opposite to the first base panel, wherein the second base panel comprises one or more raised alignment guides, wherein the raised alignment guides are offset from an edge of the second base panel and define an alignment flange, wherein the alignment flange of the second base panel extends an entirety of a perimeter of the second base panel, and wherein the side panels contact the alignment flanges of the first and second base panels;
  a back panel coupled to the side panels, the first base panel, and the second base panel to define an enclosure, and wherein the back panel contacts the alignment flanges of the first and second base panels;
  one or more shelf panels fastened to the side panels using threaded fasteners passing through the side panels, wherein the shelf panels and side panels include one or more pre-drilled apertures for alignment during assembly, wherein the one or more pre-drilled apertures are parallel to the base panel, wherein the shelf panels are selectively removable to provide customizable shelf spacing, and wherein the first base panel, side panels, second base panel, and shelf panels are formed from sheet material, have pre-drilled apertures for alignment and assembly, and configured to be disassembled and flat-packed within a box having dimensions smaller than the assembled enclosure.

2. The retail display system of claim 1, wherein the side panels are configured to mate with the alignment flanges and alignment guides such that an end surface of each side panel contacts the alignment flange of a base panel and a body surface of each side panel contacts the alignment guide of a base panel.

3. The retail display system of claim 1, wherein the back panel is configured to mate with the alignment flanges and alignment guides such that an end surface of the back panel contacts the alignment flange of a base panel and a body surface of the back panel contacts the alignment guide of a base panel.

4. The retail display system of claim 1, further comprising:
  a pair of doors rotatably attached to the side panels via hinges.

5. The retail display system of claim 1, wherein the first base panel includes a plurality of wheels or casters.

6. The retail display system of claim 1, wherein the entire system is configured to be flat-packed into a shipping container of predefined dimensions.

7. The retail display system of claim 1, wherein a first retail display system is configured to be stacked on top of a second retail display system.

8. The retail display system of claim 1, wherein the system is configured to transition between a closed storage configuration and an open display configuration.

9. The retail display system of claim 1, wherein the enclosure includes an open front without any door or closure panels.

10. The retail display system of claim 1, wherein the system consists only of a pair of base panels, a pair of side panels, and two shelf panels.

11. The retail display system of claim 1, wherein each panel includes indicia indicating an order of assembly.

12. A method of assembling a retail display system, the method comprising:
  removing a first base panel, a pair of side panels, a second base panel, and one or more shelf panels from a packaging box;
  coupling the pair of side panels to opposing ends of the first base panel, wherein the side panels are configured to mate with an alignment flange and an alignment guide of the first base panel such that an end surface of each side panel contacts the alignment flange of the first base panel and a body surface of each side panel contacts the alignment guide of the first base panel, wherein the alignment guide of the first base panel is offset from an edge of the first base panel, and wherein the alignment flange of the first base panel extends an entirety of a perimeter of the first base panel;
  coupling the second base panel to ends of the side panels opposite the first base panel to form an enclosure, wherein the second base panel is configured such that an end surface of each side panel contacts an alignment flange of the second base panel and a body surface of each side panel contacts an alignment guide of the second base panel, wherein the alignment guide of the second base panel is offset from an edge of the second base panel, and wherein the alignment flange of the second base panel extends an entirety of a perimeter of the second base panel; and
  inserting the one or more shelf panels between the side panels to form a shelving structure within the enclosure, wherein the shelf panels are fastened to the side panels using threaded fasteners passing through the side panels, wherein the shelf panels and side panels include one or more pre-drilled apertures for alignment during assembly, wherein the one or more pre-drilled apertures are parallel to the base panel, and wherein the first base panel, side panels, second base panel, and shelf panels are formed from sheet material, have pre-drilled apertures for alignment and assembly, and are dimensioned to be flat-packed within the packaging box in a disassembled, flat configuration prior to assembly.

13. The method of claim 12, further comprising coupling a back panel to the side panels, the first base panel, and the second base panel, and wherein the back panel contacts the alignment flanges of the first and second base panels.

14. The method of claim 12, further comprising attaching a pair of doors to the side panels using hinges.

15. The method of claim 12, further comprising installing a plurality of wheels or casters to the underside of the first base panel.

16. The method of claim 12, wherein inserting the one or more shelf panels comprises fastening each shelf panel to the side panels using threaded fasteners.

17. The method of claim 12, wherein selecting a subset of the shelf panels to insert provides customizable vertical spacing between shelves.

18. The method of claim 12, wherein each panel comprises pre-drilled apertures, and the coupling steps include aligning the apertures and securing fasteners therethrough.

19. The method of claim 12, wherein the packaging box is dimensioned such that its length, width, and height are each no more than 1.1 times the corresponding length, width, and height of the disassembled panel components.

\* \* \* \* \*